US010710085B2

(12) United States Patent
Bruckmann et al.

(10) Patent No.: US 10,710,085 B2
(45) Date of Patent: Jul. 14, 2020

(54) METHOD FOR CONTROLLING AN ANALYSIS DEVICE AND ANALYSIS SYSTEM

(71) Applicant: Boehringer Ingelheim Vetmedica GmbH, Ingelheim am Rhein (DE)

(72) Inventors: Guenter Bruckmann, Wuerselen (DE);
Bernhard Bender, Herzogenrath (DE);
Armin Jahanpanah, Eschweiler (DE);
Axel Niemeyer, Bielefeld (DE); Harald Pauls, Eschweiler (DE); Hannah Schmolke, Braunschweig (DE)

(73) Assignee: BOEHRINGER INGELHEIM VETMEDICA GMBH, Ingelheim am Rhein (DE)

( * ) Notice: Subject to any disclaimer, the term of this patent is extended or adjusted under 35 U.S.C. 154(b) by 238 days.

(21) Appl. No.: 15/725,348

(22) Filed: Oct. 5, 2017

(65) Prior Publication Data
US 2018/0099286 A1  Apr. 12, 2018

(30) Foreign Application Priority Data

Oct. 7, 2016 (EP) .................................... 16020381

(51) Int. Cl.
*B01L 3/00* (2006.01)
*B01L 7/00* (2006.01)
*G01N 35/00* (2006.01)

(52) U.S. Cl.
CPC .......... *B01L 7/525* (2013.01); *B01L 3/502715* (2013.01); *B01L 3/502738* (2013.01); *B01L 7/52* (2013.01); *B01L 2200/027* (2013.01); *B01L 2200/04* (2013.01); *B01L 2200/0684* (2013.01); *B01L 2200/143* (2013.01); *B01L 2200/147* (2013.01); *B01L 2200/16* (2013.01); *B01L 2300/027* (2013.01);
(Continued)

(58) Field of Classification Search
CPC ........... B01L 2200/027; B01L 2200/04; B01L 2200/0684; B01L 2200/143; B01L 2200/147; B01L 2200/16; B01L 2300/027; B01L 2300/0627; B01L 2300/0681; B01L 2300/0816; B01L 2300/0861; B01L 2400/0481; B01L 3/502715; B01L 3/502738; B01L 7/52; B01L 7/525; G01N 35/00584; G01N 2035/0019; G01N 2035/00346; G01N 2035/00366; G01N 2035/00376; G01N 2035/00386; Y10T 436/11; Y10T 436/115831; Y10T 436/12
USPC ................... 436/43, 50, 55, 147; 422/63, 67
See application file for complete search history.

(56) References Cited

U.S. PATENT DOCUMENTS 4,065,412 A * 12/1977 Dreyer ................. B01J 19/0046
525/54.1
5,096,669 A  3/1992 Lauks et al.
(Continued)

*Primary Examiner* — Maureen Wallenhorst
(74) *Attorney, Agent, or Firm* — David S. Safran; Roberts Calderon Safran & Cole, P.C.

(57) ABSTRACT

An analysis system and a method for testing a biological sample according to which, before the start of testing, the amount of energy remaining in an energy storage of the analysis device is compared with an energy requirement for the test, and the test is only started if the amount of energy meets the energy requirement, and/or a temperature-control apparatus designed for temperature-controlling the cartridge is controlled depending on an interior space temperature of the analysis device.

23 Claims, 5 Drawing Sheets

(52) U.S. Cl.
CPC .......... *B01L 2300/0627* (2013.01); *B01L 2300/0681* (2013.01); *B01L 2300/0816* (2013.01); *B01L 2300/0861* (2013.01); *B01L 2400/0481* (2013.01); *G01N 35/00584* (2013.01)

(56) References Cited

U.S. PATENT DOCUMENTS

| | | |
|---|---|---|
| 8,315,808 B2 | 11/2012 | Miyashita |
| 8,383,043 B2 | 2/2013 | Padmanabhan et al. |
| 8,932,250 B2 | 1/2015 | Montgomery et al. |
| 8,950,424 B2 | 2/2015 | Weber et al. |
| 9,040,288 B2 | 5/2015 | Handique et al. |
| 9,090,860 B2 | 7/2015 | Mason |
| 9,110,044 B2 | 8/2015 | Gumbrecht et al. |
| 9,632,053 B2 | 4/2017 | Lee et al. |
| 2010/0087325 A1 | 4/2010 | Buermann |
| 2015/0260674 A1 | 9/2015 | Tsao |

\* cited by examiner

METHOD FOR CONTROLLING AN ANALYSIS DEVICE AND ANALYSIS SYSTEM

BACKGROUND OF THE INVENTION

Field of the Invention

The present invention relates to a method and to an analysis system for testing of a biological sample.

Preferably, the present invention deals with analyzing and testing a sample, in particular, from a human or animal, particularly preferably for analytics and diagnostics, for example, with regard to the presence of diseases and/or pathogens and/or for determining blood counts, antibodies, hormones, steroids or the like. Therefore, the present invention is in particular within the field of bioanalytics. A food sample, environmental sample or another sample may optionally also be tested, in particular for environmental analytics or food safety and/or for detecting other substances.

Preferably, by means of the present invention, at least one analyte (target analyte) of a sample can be determined, identified or detected. In particular, the sample can be tested for qualitatively or quantitatively determining at least one analyte, for example in order for it to be possible to detect or identify a disease and/or pathogen.

Within the meaning of the present invention, analytes are in particular nucleic-acid sequences, in particular DNA sequences and/or RNA sequences, and/or proteins, in particular antigens and/or antibodies. In particular, by means of the present invention, nucleic-acid sequences can be determined, identified or detected as analytes of a sample, and/or proteins can be determined, identified or detected as analytes of the sample. More particularly preferably, the present invention deals with systems, devices and other apparatus for carrying out a nucleic-acid assay for detecting or identifying a nucleic-acid sequence and/or a protein assay for detecting or identifying a protein.

The present invention deals in particular with what are known as point-of-care systems, i.e., in particular with mobile systems, devices and other apparatus, and deals with methods for carrying out tests on a sample at the sampling site and/or independently and/or away from a central laboratory or the like. Preferably, point-of-care systems can be operated autonomously of or independently from a mains network for supplying electrical power.

Description of Related Art

U.S. Pat. No. 5,096,669 discloses a point-of-care system for testing a biological sample, in particular a blood sample. The system comprises a single-use cartridge and an analysis device. Once the sample has been received, the cartridge is inserted into the analysis device in order to carry out the test. The cartridge comprises a microfluidic system and a sensor apparatus comprising electrodes, which apparatus is calibrated by means of a calibration liquid and is then used to test the sample.

Furthermore, International Patent Application Publication WO 2006/125767 A1 and corresponding U.S. Pat. No. 9,110,044 B2 disclose a point-of-care system for integrated and automated DNA or protein analysis, comprising a single-use cartridge and an analysis device for fully automatically processing and evaluating molecular-diagnostic analyses using the single-use cartridge. The cartridge is designed to receive a sample, in particular blood, and in particular allows cell disruption, PCR and detection of PCR amplification products, which are bonded to capture molecules and provided with a label enzyme, in order for it to be possible to detect bonded PCR amplification products or nucleic sequences as target analytes in what is known as a redox cycling process.

International Patent Application Publication WO 2013/134582 A1 and corresponding U.S. Pat. No. 9,632,053 B2 disclose an analyte sensing device and in particular relates to devices for measuring pH, the potential of hydrogen, which is a measure of the acidity or alkalinity of a solution. A firmware of the system provides the function of a system check which verifies a battery status or detects the charge level of a battery. However, there is no hint how to improve the reliability of specific tests regarding sufficient energy.

U.S. patent application Publication 2015/0260674 A1 relates to an electrochemical analysis and simulation device. The device comprises an indicating unit coupled to a power supply unit and configured to indicate an electric power status of the power supply unit. However, there is no hint how to improve the reliability of specific tests regarding sufficient energy.

U.S. Pat. No. 8,932,250 B2 discloses an insulin infusion pump comprising a battery. A warning screen is displayed when the battery in the infusion pump is very low and only has about another hour of use. However, there is no hint how to improve the reliability of specific tests regarding sufficient energy.

European Patent Application EP 1 980 851 A2 and corresponding U.S. Pat. No. 8,315,808 B2 relate to a blood sugar meter, wherein a notification is displayed when a battery of the meter is to be replaced. However, there is no hint how to improve the reliability of specific tests regarding sufficient energy.

U.S. Pat. No. 8,383,043 B2 discloses a portable sample analyzer with a disposable fluidic cartridge. The temperature in or around the sample analyzer may be periodically sensed and sent to a remote site. However, there is no hint regarding improving reliability and precision of a test in this regard.

U.S. Pat. No. 9,090,860 B2 relates to a system which controls the temperature of biological samples on a support structure. The temperature of the support structure, the samples, and/or the complimentary probes may be increased or decreased. The system is equipped with multiple temperature sensors which are used to monitor the temperatures of the fluid introduced into, present in, or exiting from the support structure. However, there is no hint regarding improving reliability and precision of a test in this regard.

SUMMARY OF THE INVENTION

When operated using an energy storage means, such as an accumulator, the reliability of point-of-care systems depends on sufficient energy reserves. Furthermore, the conclusiveness of a test can depend on or be impaired by different ambient temperatures.

The problem addressed by the present invention is to provide a method, a computer program product and an analysis system for more precisely and/or more reliably testing a sample.

The above problem is solved by a method and by an analysis system as described herein.

The present invention relates in principle to the testing of, in particular, a biological sample using an analysis system. The analysis system preferably comprises a cartridge for receiving the sample. The cartridge preferably comprises a fluid system having a sensor portion through which fluid can flow. It is preferable for the analysis system to comprise an analysis device for receiving the cartridge and subsequently carrying out the test using the received cartridge.

The present invention relates in particular to a method for controlling the analysis device, in particular for preparing and/or carrying out the test on a sample by means of the analysis device acting on the cartridge.

In one aspect of the present invention, before the start of the testing, the amount of energy remaining in an energy storage means of the analysis device is compared with an energy requirement for the testing, and the testing is only started if the amount of energy meets the energy requirement.

The analysis device is preferably designed to be operated autonomously and/or independently of the mains and/or is operated autonomously or in a manner in which it is separated from mains power networks. In particular, the analysis device obtains or is designed to obtain power for the test from an energy storage means of the analysis device. This makes it possible for the analysis device to be used in a mobile manner and on site, without it being necessary to ensure an external power supply for the test.

It is also preferable for the analysis device and/or the cartridge and/or different cartridges to support different tests and/or tests having different energy requirements. In this case, it is preferable to define the energy requirement according to the test to be carried out and/or the cartridge to be used. In other words, the energy requirement is defined and/or is or can be specified depending on the test to be carried out. This makes it possible to ensure, individually and according to the test to be carried out, that said test can be carried out completely using the amount of energy remaining in the energy storage means. At the same time, this prevents a test having a lower energy requirement from also being blocked if the remaining amount of energy only fails to meet the higher energy requirement of another test.

In particular, a test in the form of a nucleic-acid assay and a test in the form of a protein assay can be carried out using the analysis device, which tests can be differentiated by the analysis device in terms of the energy requirement. These tests are examples of different tests that the analysis system, in particular the analysis device, can support using the same or different cartridges. In general, the energy consumption is significantly greater in the nucleic-acid assay than in the protein assay due to the PCR to be carried out in the former case. It is therefore possible to carry out a protein assay using a remaining amount of energy in the energy storage means of the analysis device, whereas a nucleic-acid assay could not be completely carried out. Accordingly, in such a case, it can be provided that the protein assay can be permitted, but not the nucleic-acid assay.

Preferably, the energy requirement is established, retrieved or determined using a cartridge identifier that corresponds to the cartridge. Preferably, the energy requirement is established, retrieved or determined on the basis of the test to be carried out. In this case, the test to be carried out is particularly preferably determined or established using the cartridge identifier that corresponds to the cartridge, and the energy requirement for this test is compared with the remaining amount of energy.

Control information is preferably provided for carrying out the test. Using the control information, the analysis device can control procedures/processes on or using the cartridge in order to carry out the test. In particular, the control information specifies a sequence in which actuators that act on the cartridge in order to carry out the test are actuated. It is preferable for the control information to comprise the energy requirement or for the energy requirement to be determined using the control information. In this way, the energy requirement for the specific test to which the control information corresponds can be determined, and the start of the test can be enabled and/or blocked by means of comparison with the remaining amount of energy.

The control information and/or the energy requirement is/are preferably identified, determined and/or retrieved using the identifier that corresponds to the cartridge. This makes it possible to always determine the energy requirement individually for the upcoming test, and to then prevent and/or block the start of the test only if the amount of energy does not meet this energy requirement.

Another aspect of the present invention, which can also be implemented independently, relates to the analysis system for carrying out the proposed method.

The analysis system is preferably designed for testing the in particular biological sample, the analysis system comprising a cartridge for receiving the sample, and the analysis system comprising an analysis device for receiving the cartridge and subsequently carrying out the test using the received cartridge.

The analysis device, preferably together with a control apparatus, is designed to compare the amount of energy remaining in an energy storage means of the analysis device with an energy requirement for the test before the start of the test, and to block a start of the test if the amount of energy is below the energy requirement. Alternatively, or additionally, the analysis device is designed to allow or enable the start of the test if the amount of energy meets the energy requirement.

In particular, the analysis device comprises an energy management module for determining the amount of energy remaining in the energy storage means. Moreover, the control apparatus is designed for carrying out the test, in particular for controlling actuators for acting on the cartridge.

The energy management module can be configured to determine, in particular to measure, preferably continuously, the amount of energy, and to transmit this to the control apparatus.

The control apparatus can then compare the amount of energy with the energy requirement, and render the start of the test dependent on the result of the comparison. It is in particular provided in this case for the control apparatus to first determine and/or retrieve the energy requirement for an upcoming test and/or a specific cartridge, in order to be able to carry out the comparison for the individual cartridge and/or test.

Particularly preferably, the energy requirement or control information comprising the energy requirement or control information designed for determining or establishing, in particular calculating, the energy requirement, is stored in a database and can be identified, retrieved and/or transmitted to the analysis device on the basis of the cartridge identifier that corresponds to the cartridge, preferably such that the control apparatus can carry out the comparison and can allow or block the start of the test according to the result of the comparison.

In addition to a sufficient amount of energy, it has been found that taking account of the device temperature is an essential criterion for a reliable test.

Another aspect of the present invention, which can also be implemented independently, relates to a method for controlling the analysis device, in which a temperature-control apparatus designed for (directly) temperature-controlling the cartridge and/or the sample in the cartridge is controlled depending on an interior space temperature of the analysis device.

In view of the fact that the analysis device can be used in a mobile manner, very different temperatures are possible for the surroundings, and thus also the interior space of the analysis device, at the time at which the test is intended to be carried out. In particular, temperatures below normal or standard room temperatures of for example 20° C. are possible. In this regard, in order to carry out the test in a reliable and/or reproducible manner, it is advantageous to be able to influence the interior space temperature of the analysis device, in particular to be able to heat up the interior space of the analysis device. This can take place without the cartridge, without the cartridge or sample being inserted into analysis device, and/or before the testing starts.

Climate control of the interior space of the analysis device is in principle possible using heating elements or the like known in the art. In the present invention, using the temperature-control apparatus makes it possible, in contrast, to avoid the need for additional apparatus for climate control of the interior space of the analysis device, as a result of which the analysis device can be produced more simply and more cost-effectively. The analysis device thus preferably comprises a temperature-control apparatus for temperature-controlling the cartridge, for example in order to carry out a PCR on the sample in the cartridge. This temperature-control apparatus is used according to the present invention for temperature-controlling, in particular heating up, the interior space.

Preferably, for this purpose, the interior space temperature is measured using a temperature sensor that is not directly in contact with the temperature-control apparatus and/or the cartridge. In particular, said temperature sensor is arranged not to get into or is not used in direct thermal contact with the cartridge and/or is not in contact with said cartridge while/when measuring the interior space temperature.

In order to temperature-control the cartridge and/or the sample, the temperature of the side of the temperature-control apparatus facing the cartridge is usually measured, and the temperature is feedback controlled on this basis. This does not allow any direct control or feedback control of the interior space temperature. In contrast, in the operating mode according to the present invention, a temperature sensor that is independent of the temperature-control apparatus, from the cartridge and/or from the sample is preferably used for feedback controlling and/or for providing an actual value for feedback controlling the temperature-control apparatus.

The interior space temperature is preferably changed, in particular increased, using the temperature-control apparatus before the testing is started, before the cartridge is or can be inserted into the analysis device and/or before the sample is conveyed.

By means of the present aspect, the sample temperature preferably is not changed or influenced directly. The sample can be stored in a receiving cavity of the cartridge while the method is being carried out, which cavity cannot be temperature-controlled directly by the temperature-control apparatus. In this way, the interior space temperature can be controlled or feedback controlled using the temperature-control apparatus, preferably without the temperature-control apparatus directly changing the temperature of the sample. It is, however, not impossible for the temperature of the sample to be indirectly influenced by changing the interior space temperature, e.g., the air temperature within the analysis device.

In other words, a basic concept of this aspect is that the interior space of the analysis device is preferably heated to a specified or specifiable value, value range or the like using the waste heat from the temperature-control apparatus. As a result, space and costs are saved compared with alternative solutions having separate apparatus for climate control.

In this aspect, it is not necessary that the cartridge is inserted in the analysis device. Rather, the analysis device preferably is brought to a desired work temperature/interior space temperature before the cartridge is inserted or insertable. Alternatively, or additionally, the interior space temperature can be controlled when the cartridge has already been inserted. In particular, the analysis device can be pre-heated before insertion of the cartridge and afterwards the cartridge is inserted or insertable into the analysis device. Then, the cartridge might warm up due to the interior space temperature then being the temperature of the ambient of the inserted cartridge.

The temperature sensor measuring the interior space temperature preferably is not in direct contact with cartridge and/or with a receptacle for the cartridge of the analysis device and/or with the temperature-control apparatus.

The ambient space temperature preferably is measured remote from the cartridge and/or a receptacle for the cartridge of the analysis device and/or the temperature-control apparatus.

A temperature threshold value is preferably provided for the test. If the interior space temperature is or goes below this temperature threshold value, the temperature-control apparatus is operated such that the temperature-control apparatus heats the interior space of the analysis device until the interior space temperature reaches or exceeds the temperature threshold value.

It is preferable for the test to only be (enabled to be automatically) started and/or for the sample to only be conveyed once the interior space temperature reaches or exceeds the temperature threshold value in this manner. Thus, before the test has begun, the temperature-control apparatus is operated only in order to temperature-control, in particular heat up, the interior space of the analysis device. Subsequently, i.e., during the test, the temperature-control apparatus can be used for temperature-controlling the sample.

On the side remote from the cartridge, the temperature-control apparatus preferably comprises a heat sink that is arranged in the interior space of the analysis device and is or can be heated in order to temperature-control the interior space. The use of the heat sink allows effective and efficient temperature-control of the interior space on account of the low thermal contact resistance between the temperature-control apparatus and the interior space, which is typically achieved in a heat sink by material with good thermal conductivity and structures having a large surface area. The heat sink is preferably heated for temperature-controlling the interior space of the analysis device.

The temperature-control apparatus preferably comprises a Peltier element, by means of which heat and/or waste heat is or can be generated and/or the interior space temperature of the analysis device is or can be controlled.

In this case, it is preferable for the Peltier element to be operated cyclically, i.e., having a voltage and/or current profile that comprises a change of sign, such that the side of the Peltier element facing the interior space and/or facing away from the cartridge is alternately cooled and heated. As a result, on account of the efficiency of the Peltier element, more heat is produced than cold, and therefore the interior space of the analysis device can be heated up. The cyclical operation of the Peltier element furthermore means that the cartridge is not adversely affected either by being heated too much or by being cooled too much.

It is alternatively also possible, however, for the Peltier element to be operated continuously such that it cools on the side facing the cartridge and heats on the side facing away from the cartridge. In this case, the interior space is preferably likewise heated by the waste heat and/or dissipated power of the Peltier element. It is preferable for the side of the temperature-control apparatus facing the cartridge not to fall below a specific minimum temperature, in particular the dew point of the atmosphere in the interior space of the analysis device, preferably by taking account of the temperature on the cold side and/or on the side facing the cartridge when controlling the Peltier element. This prevents the formation of condensation.

Alternatively, or additionally, the Peltier element is operated such that none of the sides falls below 0° C., in order to prevent icing. The temperature-control apparatus is preferably controlled or feedback controlled such that the temperature does not fall below the minimum temperature, in particular the dew point. This control and/or feedback control can be implemented, provided or carried out in addition to the control and/or feedback control of the interior space temperature, in particular as a secondary condition.

The test is preferably started only if the interior space temperature has reached a desired value and/or the temperature threshold value. It is also preferable for the cartridge to be returned, using the temperature-control apparatus and before the start of the test, to a temperature or a temperature range that allows or does not endanger the test, in particular at least substantially to the interior space temperature.

Another aspect of the present invention, which can also be implemented independently, relates to the analysis system comprising the analysis device, which is designed to carry out the method. In particular, the analysis device comprises the temperature-control apparatus that is designed for temperature-controlling the cartridge, the analysis device being designed to control the temperature-control apparatus according to the interior space temperature of the analysis device, particularly preferably in the manner explained above.

Another aspect of the present invention, which can also be implemented independently, relates to a computer program product comprising program code means which, when executed, cause the method to be implemented. In particular, the computer program product is designed to control actuators of the analysis system and/or analysis device in the manner described, a control apparatus of the analysis device being able to control and/or feedback control the operation of the temperature-control apparatus using the program code means, preferably depending on a sensor value from the temperature sensor for determining the interior space temperature.

Moreover, the control apparatus can compare the amount of energy remaining in the energy storage means with an energy requirement and enable or block the start of a test depending on the result using the program code means. The computer program product preferably is a non-transitory computer-readable media.

The term "analysis device" is preferably understood to mean an instrument which is in particular mobile and/or can be used on site, and/or which is designed to chemically, biologically and/or physically test and/or analyze a sample or a component thereof, preferably in and/or by means of a cartridge. In particular, the analysis device controls the pretreatment and/or testing of the sample in the cartridge. For this purpose, the analysis device can act on the cartridge, in particular such that the sample is conveyed, temperature-controlled and/or measured in the cartridge.

The term "cartridge" is preferably understood to mean a structural apparatus or unit designed to receive, to store, to physically, chemically and/or biologically treat and/or prepare and/or to measure a sample, preferably in order to make it possible to detect, identify or determine at least one analyte, in particular a protein and/or a nucleic-acid sequence, of the sample.

A cartridge within the meaning of the present invention preferably comprises a fluid system having a plurality of channels, cavities and/or valves for controlling the flow through the channels and/or cavities.

The term "test", also called and optionally replaceable with "testing", as used herein preferably means a test procedure, test sequence, and/or performing an assay, in particular one, several or all steps for performing an assay to determine one or more analytes of a sample. The steps are preferably realized by or within the analysis system, analysis device and/or cartridge.

An "assay" according to the present invention is preferably an investigative procedure for qualitatively and/or quantitatively measuring, detecting and/or identifying the presence, amount, and/or functional activity of a target entity or analyte of the sample. The analyte can, e.g., be a drug, a biological, chemical and/or biochemical substance, and/or a cell in an organism or organic sample. In particular, the analyte can be a molecule, a nucleic-acid sequence, a DNA, an RNA and/or a protein.

Preferably, the assay according to the present invention is a nucleic-acid assay for detecting or identifying a nucleic-acid sequence and/or a protein assay for detecting or identifying a protein.

An assay, test or test procedure according to the present invention accordingly preferably covers at least one of: controlling actuators of the analysis device like a pump drive, temperature control apparatus, and valve actuators; acting on the cartridge or sample; treating the sample; preparing the sample; performing one or more mixing processes and/or reactions with the sample; conveying the sample; and measuring one or more properties of the sample, particularly with the sensor apparatus of the cartridge.

An assay, test or test procedure according to the present invention preferably starts or begins with the analysis device acting on and/or controlling processes on the cartridge and/or the sample. In particular, a test starts or begins with actuators acting on the cartridge. For example, a test can start with conveying the sample within the cartridge.

Methods and/or steps performed before insertion or receiving of the cartridge into/by the analysis device and/or before conveying, treating and/or preparing the sample within said cartridge are preferably not part of an assay, test or test procedure according to the present invention.

The "control information", thus, preferably is configured to carry out such an assay, test or test procedure or to enable the analysis system or the analysis device to carry out such an assay, test or test procedure. Preferably, said control information is configured to control or to define a control sequence or to be used by the analysis device to carry out said assay, test or test procedure. A "control information", thus, preferably has instructions being configured for controlling the assay, test or test procedure. In particular, the control information is configured to control an assay, test or test procedure by defining steps or parameters of steps including controlling and/or feedback controlling actuators like the pump drive, the temperature control apparatus and valve actuators.

In particular, within the meaning of the present invention, a cartridge is designed to be at least substantially planar, flat and/or card-like, in particular is designed as a (micro)fluidic card and/or is designed as a main body or container that can preferably be closed and/or said cartridge can be inserted and/or plugged into a proposed analysis device when it contains the sample.

The above-mentioned aspects and features of the present invention and aspects and features of the present invention that will become apparent from the following description can in principle be implemented independently from one another, but also in any combination or order.

Other aspects, advantages, features and properties of the present invention will become apparent from the following description of a preferred embodiment with reference to the accompanying drawings.

DETAILED DESCRIPTION OF THE INVENTION

In the figures, which are only schematic and sometimes not to scale, the same reference signs are used for the same or similar parts and components, corresponding or comparable properties and advantages being achieved even if these are not repeatedly described.

Figure 1:
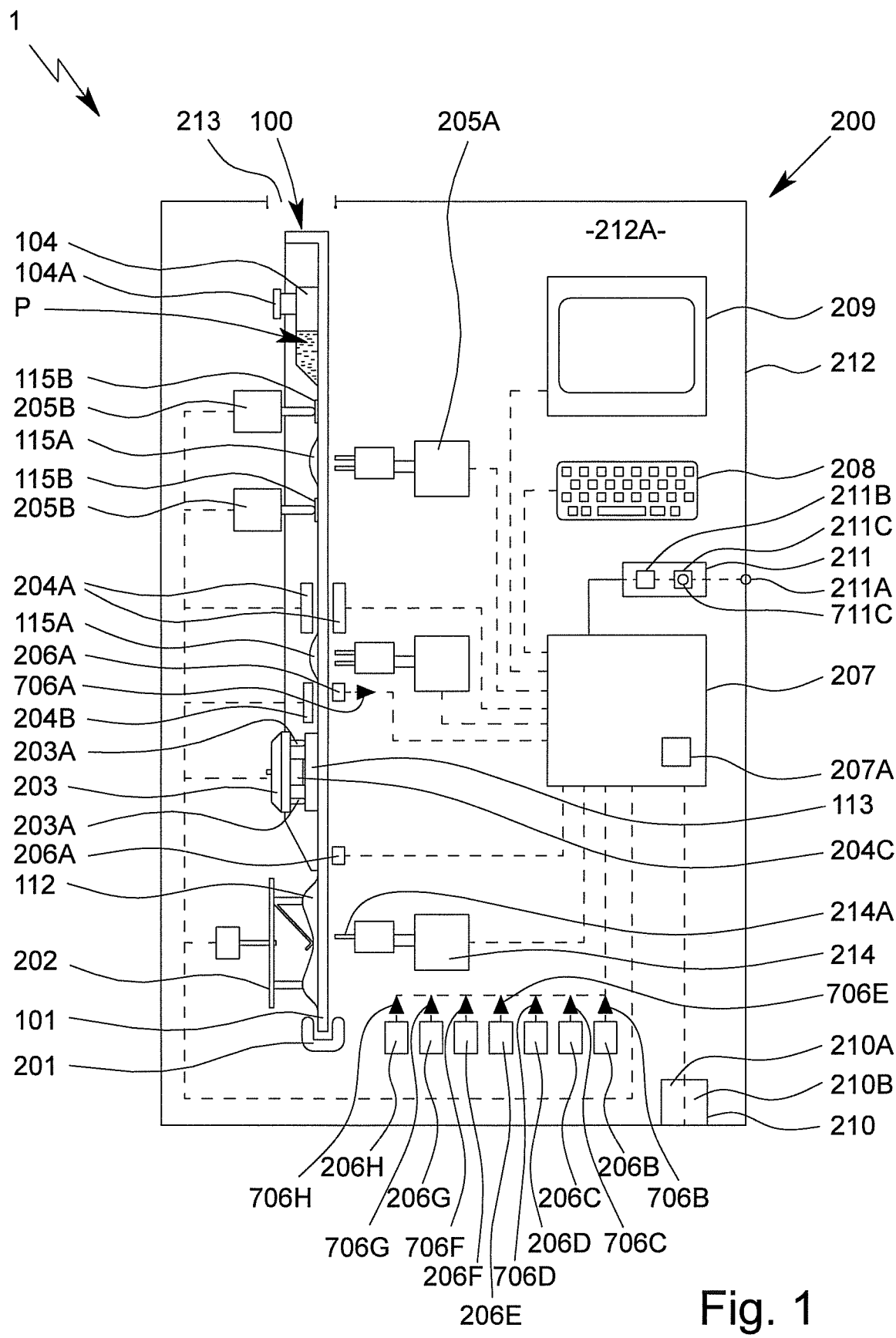
FIG. 1 is a schematic view of a proposed analysis system and/or analysis device comprising a proposed cartridge received therein.

FIG. 1 is a highly schematic view of a proposed analysis system 1 and analysis device 200 for testing an in particular biological sample P, preferably by means of or in an apparatus or cartridge 100.

Figure 2:
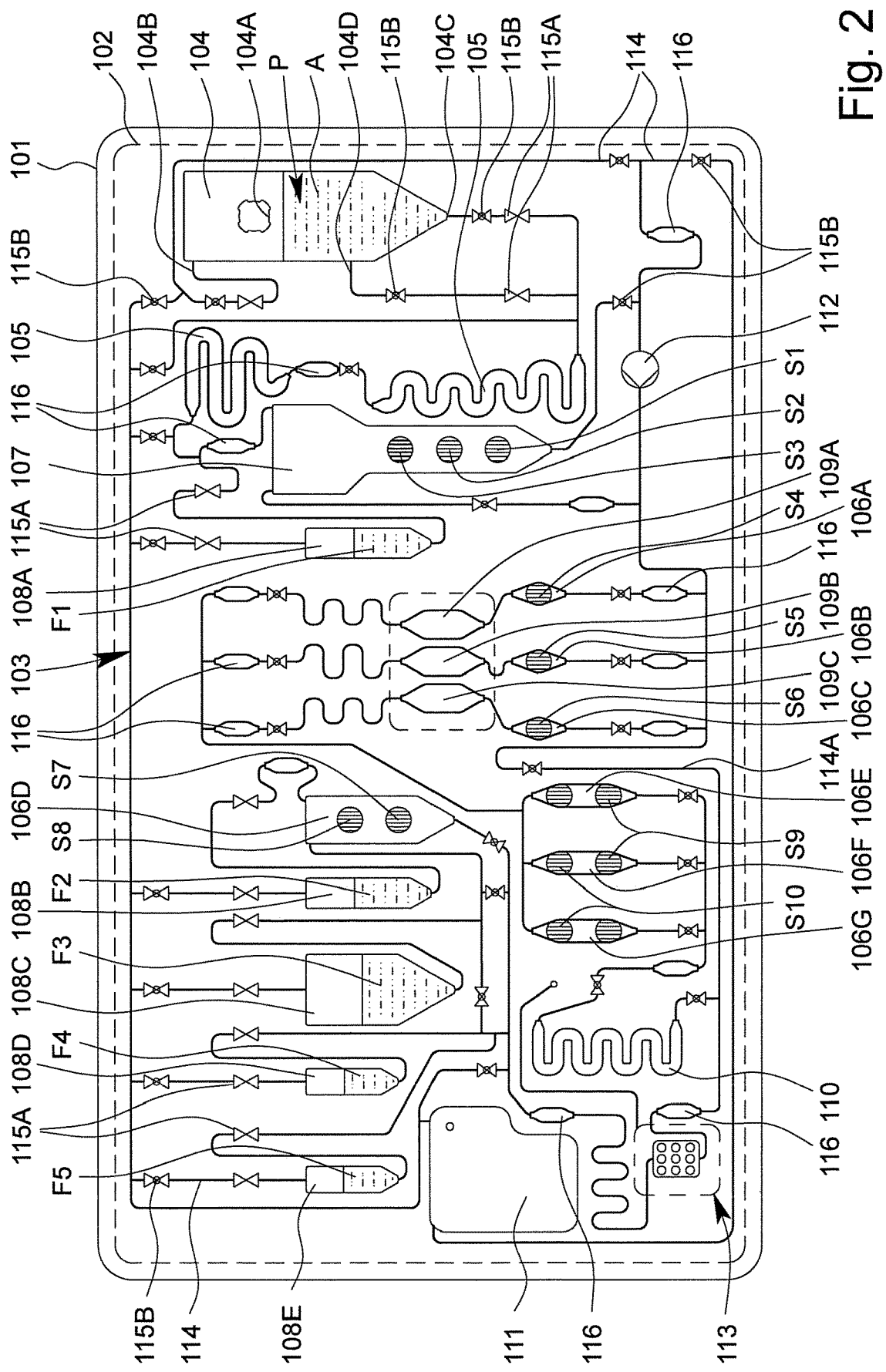
FIG. 2 is a schematic view of the cartridge.

FIG. 2 is a schematic view of a preferred embodiment of the proposed apparatus or cartridge 100 for testing the sample P. The apparatus or cartridge 100 in particular forms a handheld unit, and in the following is merely referred to as a cartridge.

The term "sample" is preferably understood to mean the sample material to be tested, which is in particular taken from a human or animal. In particular, within the meaning of the present invention, a sample is a fluid, such as saliva, blood, urine or another liquid, preferably from a human or animal, or a component thereof. Within the meaning of the present invention, a sample may be pretreated or prepared if necessary, or may come directly from a human or animal or the like, for example. A food sample, environmental sample or another sample may optionally also be tested, in particular for environmental analytics, food safety and/or for detecting other substances, preferably natural substances, but also biological or chemical warfare agents, poisons or the like.

Preferably, the analysis system 1 and/or analysis device 200 controls the testing of the sample P in particular in or on the cartridge 100 and/or is used to evaluate the testing and/or to collect, to process and/or to store measured values from the test.

The analysis system 1 preferably comprises one or more cartridges 100 for receiving the sample P. The analysis system 1 preferably comprises the analysis device 200 for receiving the cartridge 100 and subsequently carrying out the test using the received cartridge 100.

By means of the proposed analysis system 1, analysis device 200 and/or the cartridge 100 and/or using the proposed method for testing the sample P, preferably an analyte A of the sample P, in particular a (certain) nucleic-acid sequence and/or a (certain) protein, or particularly preferably a plurality of analytes A of the sample P, can be determined, identified or detected. Said analytes A are in particular detected, identified and/or measured not only qualitatively, but particularly preferably also quantitatively.

Therefore, the sample P can in particular be tested for qualitatively or quantitatively determining at least one analyte A, for example, in order for it to be possible to detect a disease and/or pathogen or to determine other values, which are important for diagnostics, for example.

Particularly preferably, a molecular-biological test is made possible by means of the analysis system 1 and/or analysis device 200 and/or by means of the cartridge 100.

Particularly preferably, a nucleic-acid assay for detecting a nucleic-acid sequence, in particular a DNA sequence and/or RNA sequence, and/or a protein assay for detecting a protein, in particular an antigen and/or antibody, are made possible or are carried out.

Preferably, the sample P or individual components of the sample P or analyte A can be amplified if necessary, in particular by means of PCR, and tested, identified or detected in the analysis system 1, analysis device 200 and/or in the cartridge 100, and/or for the purpose of carrying out the nucleic-acid assay. Preferably, amplification products of the analyte or analytes A are thus produced.

In the following, further details are first given on a preferred construction of the cartridge 100, with features of the cartridge 100 preferably also directly representing features of the analysis system 1, in particular even without any further explicit explanation.

The cartridge 100 is preferably at least substantially planar, flat, plate-shaped and/or card-shaped.

The cartridge 100 preferably comprises an in particular at least substantially planar, flat, plate-shaped and/or card-like main body or support 101, the main body or support 101 in particular being made of and/or injection-molded from plastics material, particularly preferably polypropylene.

The cartridge 100 preferably comprises at least one film or cover 102 for covering the main body 101 and/or cavities and/or channels formed therein at least in part, in particular on the front, and/or for forming valves or the like, as shown by dashed lines in FIG. 2.

The analysis system 1 or cartridge 100 or the main body 101 thereof, in particular together with the cover 102, preferably forms and/or comprises a fluidic system 103, referred to in the following as the fluid system 103.

The cartridge 100, the main body 101 and/or the fluid system 103 are preferably at least substantially vertically oriented in the operating position and/or during the test, in particular in the analysis device 200, as shown schematically in FIG. 1. In particular, the main plane or surface extension of the cartridge 100 thus extends at least substantially vertically in the operating position.

The cartridge 100 and/or the fluid system 103 preferably comprises a plurality of cavities, in particular at least one receiving cavity 104, at least one metering cavity 105, at least one intermediate cavity 106A-G, at least one mixing cavity 107, at least one storage cavity 108, at least one reaction cavity 109, at least one intermediate temperature-control cavity 110 and/or at least one collection cavity 111, as shown in FIG. 1 and FIG. 2.

The cartridge 100 and/or the fluid system 103 also preferably comprises at least one pump apparatus 112 and/or at least one sensor arrangement or sensor apparatus 113.

Some, most or all of the cavities are preferably formed by chambers and/or channels or other depressions in the cartridge 100 and/or the main body 101, and particularly preferably are covered or closed by the cover 102. However, other structural solutions are also possible.

In the example shown, the cartridge 100 or the fluid system 103 preferably comprises two metering cavities 105, a plurality of intermediate cavities 106A to 106G, a plurality of storage cavities 108A to 108E and/or a plurality of reaction cavities 109, which can preferably be loaded separately from one another, in particular a first reaction cavity 109A, a second reaction cavity 109B and an optional third reaction cavity 109C, as can be seen in FIG. 2.

The reaction cavity/cavities 109A-C is/are used in particular to carry out an amplification reaction, in particular PCR, or several, preferably different, amplification reactions, in particular PCRs. It is preferable to carry out several, preferably different, PCRs, i.e., PCRs having different primer combinations or primer pairs, in parallel and/or independently and/or in different reaction cavities 109A-C.

To carry out the nucleic-acid assay, preferably nucleic-acid sequences, as analytes A of the sample P, are amplified in the reaction cavity/cavities 109A-C by means of an amplification reaction, in particular in order to produce amplification products for the subsequent detection in the sensor arrangement or sensor apparatus 113.

Within the meaning of the present invention, amplification reactions are in particular molecular-biological reactions in which an analyte A, in particular a nucleic-acid sequence, is amplified/copied and/or in which amplification products, in particular nucleic-acid products, of an analyte A are produced. Particularly preferably, PCRs are amplification reactions within the meaning of the present invention.

The amplification products and/or other portions of the sample P produced in the one or more reaction cavities 109A-C can be conducted or fed to the connected sensor arrangement or sensor apparatus 113, in particular by means of the pump apparatus 112.

The sensor apparatus 113 is used in particular for detecting, particularly preferably qualitatively and/or quantitatively determining, the analyte or analytes A of the sample P, in this case particularly preferably the nucleic-acid sequences and/or proteins as the analytes A. Alternatively or additionally, however, other values may also be collected or determined.

As already explained at the outset, in particular nucleic-acid sequences, preferably DNA sequences and/or RNA sequences, and/or proteins, in particular antigens and/or antibodies, are preferably qualitatively and/or quantitatively determined as analytes A of the sample P. In the following, however, a distinction is not made between nucleic-acid sequences and proteins, or between the nucleic-acid assay for detecting nucleic-acid sequences and the protein assay for detecting proteins.

In particular, the pump apparatus 112 comprises or forms a tube-like or bead-like raised portion, in particular by means of the film or cover 102, particularly preferably on the back of the cartridge 100, as shown schematically in FIG. 1.

The cartridge 100, the main body 101 and/or the fluid system 103 preferably comprise a plurality of channels 114 and/or valves 115A, 115B, as shown in FIG. 2.

By means of the channels 114 and/or valves 115A, 115B, the cavities 104 to 111, the pump apparatus 112 and/or the sensor arrangement and/or sensor apparatus 113 can be temporarily and/or permanently fluidically interconnected and/or fluidically separated from one another, as required and/or optionally or selectively, in particular such that they are controlled by the analysis system 1 or the analysis device 200.

The cavities 104 to 111 are preferably each fluidically linked or interconnected by a plurality of channels 114. Particularly preferably, each cavity is linked or connected by at least two associated channels 114, in order to make it possible for fluid to fill, flow through and/or drain from the respective cavities as required.

The fluid transport or the fluid system 103 is preferably not based on capillary forces, or is not exclusively based on said forces, but in particular is essentially based on the effects of gravity and/or pumping forces and/or compressive forces and/or suction forces that arise, which are particularly preferably generated by the pump or pump apparatus 112. In this case, the flows of fluid or the fluid transport and the metering are controlled by accordingly opening and closing the valves 115A, 115B and/or by accordingly operating the pump or pump apparatus 112, in particular by means of a pump drive 202 of the analysis device 200.

Preferably, each of the cavities 104 to 110 has an inlet at the top and an outlet at the bottom in the operating position. Therefore, if required, only liquid from the respective cavities can be removed via the outlet.

In the operating position, the liquids from the respective cavities are preferably removed, in particular drawn out, via the outlet that is at the bottom in each case, it preferably being possible for gas or air to flow and/or be pumped into the respective cavities via the inlet that is in particular at the top. In particular, relevant vacuums in the cavities can thus be prevented or at least minimized when conveying the liquids.

In particular, the cavities, particularly preferably the storage cavity/cavities 108, the mixing cavity 107 and/or the receiving cavity 104, are each dimensioned and/or oriented in the normal operating position such that, when said cavities are filled with liquid, bubbles of gas or air that may potentially form rise upwards in the operating position, such that the liquid collects above the outlet without bubbles. However, other solutions are also possible here.

The receiving cavity 104 preferably comprises a connection 104A for introducing the sample P. In particular, the sample P may for example be introduced into the receiving cavity 104 and/or cartridge 100 via the connection 104A by means of a pipette, syringe or other instrument.

Preferably, at least one valve 115A, 115B is assigned to each cavity, the pump apparatus 112 and/or the sensor apparatus 113 and/or is arranged upstream of the respective inlets and/or downstream of the respective outlets.

Preferably, the cavities 104 to 111 or sequences of cavities 104 to 111, through which fluid flows in series or in succession for example, can be selectively released and/or fluid can selectively flow there-through by the assigned valves 115A, 115B being actuated, and/or said cavities can be fluidically connected to the fluid system 103 and/or to other cavities.

In particular, the valves 115A, 115B are formed by the main body 101 and the film or cover 102 and/or are formed in another manner, for example by additional layers, depressions or the like.

Particularly preferably, one or more valves 115A are provided which are preferably tightly closed initially or in the storage state, particularly preferably in order to seal liquids or liquid reagents F, located in the storage cavities 108, and/or the fluid system 103 from the open receiving cavity 104 in a storage-stable manner.

Preferably, an initially closed valve 115A is arranged upstream and downstream of each storage cavity 108. Said valves are preferably only opened, in particular automatically, when the cartridge 100 is actually being used and/or while inserting the cartridge 100 into the analysis device 200 and/or for carrying out the assay.

A plurality of valves 115A, in particular three valves in this case, are preferably assigned to the receiving cavity 104, in particular if the intermediate connection 104D is provided in addition to the inlet 104B and the outlet 104C. Depending on the use, in addition to the valve 115A on the inlet 104B, then preferably only the valve 115A either at the outlet 104C or at the intermediate connection 104D is opened.

The valves 115A assigned to the receiving cavity 104 seal the fluid system 103 and/or the cartridge 100 in particular fluidically and/or in a gas-tight manner until the sample P is inserted and the receiving cavity 104 or a connection 104A of the receiving cavity 104 is closed.

As an alternative or in addition to the valves 115A (which are initially closed), one or more valves 115B are preferably provided which are not closed in a storage-stable manner and/or which are open initially and/or which can be closed by actuation. These valves are used in particular to control the flows of fluid during the test.

The cartridge 100 is preferably designed as a microfluidic card and/or the fluid system 103 is preferably designed as a microfluidic system. In the present invention, the term "microfluidic" is preferably understood to mean that the respective volumes of individual cavities, some of the cavities or all of the cavities 104 to 111 and/or channels 114 are, separately or cumulatively, less than 5 ml or 2 ml, particularly preferably less than 1 ml or 800 µl, in particular less than 600 µl or 300 µl, more particularly preferably less than 200 µl or 100 µl.

Particularly preferably, a sample P having a maximum volume of 5 ml, 2 ml or 1 ml can be introduced into the cartridge 100 and/or the fluid system 103, in particular the receiving cavity 104.

Reagents and liquids which are preferably introduced or provided before the test in liquid form as liquids or liquid reagents F and/or in dry form as dry reagents S are required for testing the sample P, as shown in the schematic view according to FIG. 2 by reference signs F1 to F5 and S1 to S10.

Furthermore, other liquids F, in particular in the form of a wash buffer, solvent for dry reagents S and/or a substrate, for example in order to form detection molecules and/or a redox system, are also preferably required for the test, the detection process and/or for other purposes, and are in particular provided in the cartridge 100, i.e., are likewise introduced before use, in particular before delivery. At some points in the following, a distinction is not made between liquid reagents and other liquids, and therefore the respective explanations are accordingly also mutually applicable.

The analysis system 1 or the cartridge 100 preferably contains all the reagents and liquids required for pretreating the sample P and/or for carrying out the test or assay, in particular for carrying out one or more amplification reactions or PCRs, and therefore, particularly preferably, it is only necessary to receive the optionally pretreated sample P.

The cartridge 100 or the fluid system 103 preferably comprises a bypass 114A that can optionally be used, in order for it to be possible, if necessary, to conduct or convey the sample P or components thereof past the reaction cavities 109A-C and/or, by bypassing the optional intermediate temperature-control cavity 110, also directly to the sensor apparatus 113.

The cartridge 100, the fluid system 103 and/or the channels 114 preferably comprise sensor portions 116 or other apparatus for detecting liquid fronts and/or flows of fluid.

It is noted that various components, such as the channels 114, the valves 115A, 115B, in particular the valves 115A that are initially closed and the valves 115B that are initially open, and the sensor portions 116 in FIG. 2 are, for reasons of clarity, only labelled in some cases, but the same symbols are used in FIG. 2 for each of these components.

The collection cavity 111 is preferably used for receiving excess or used reagents and liquids and volumes of the sample, and/or for providing gas or air in order to empty individual cavities and/or channels.

In particular, the collection cavity 111 can optionally be connected to individual cavities and channels or other apparatus fluidically in order to remove reagents and liquids from said cavities, channels or other apparatus and/or to replace said reagents and liquids with gas or air. The collection cavity 111 is preferably given appropriate large dimensions.

Once the sample P has been introduced into the receiving cavity 104 and the connection 104A has been closed, the cartridge 100 can be inserted into and/or received in the proposed analysis device 200 in order to test the sample P, as shown in FIG. 1. Alternatively, the sample P could also be fed in later.

FIG. 1 shows the analysis system 1 in a ready-to-use state for carrying out a test or assay on the sample P received in the cartridge 100, and/or in the operating position. In this state, the cartridge 100 is therefore linked to, received by and/or inserted into the analysis device 200.

In the following, some features and aspects of the analysis device 200 are first explained in greater detail, in particular on the basis of FIG. 1. The features and aspects relating to said device are preferably also directly features and aspects of the proposed analysis system 1, in particular even without any further explicit explanation.

The analysis system 1 or analysis device 200 preferably comprises a mount or receptacle 201 for mounting and/or receiving the cartridge 100.

Preferably, the cartridge 100 is fluidically, in particular hydraulically, separated or isolated from the analysis device 200. In particular, the cartridge 100 forms a preferably independent and in particular closed or sealed fluidic or hydraulic system 103 for the sample P and the reagents and other liquids. In this way, the analysis device 200 does not come into direct contact with the sample P and can in particular be reused for another test without being disinfected and/or cleaned first.

It is however provided that the analysis device 200 can be connected or coupled mechanically, electrically, thermally and/or pneumatically to the cartridge 100.

In particular, the analysis device 200 is designed to have a mechanical effect, in particular for actuating the pump apparatus 112 and/or the valves 115A, 115B, and/or to have a thermal effect, in particular for temperature-controlling the reaction cavity/cavities 109A-C and/or the intermediate temperature-control cavity 110.

In addition, the analysis device 200 can preferably be pneumatically connected to the cartridge 100, in particular in order to actuate individual apparatus, and/or can be electrically connected to the cartridge 100, in particular in order to collect and/or transmit measured values, for example from the sensor apparatus 113 and/or sensor portions 116.

The analysis system 1 or analysis device 200 preferably comprises a pump drive 202, the pump drive 202 in particular being designed for mechanically actuating the pump apparatus 112.

Preferably, a head of the pump drive 202 can be rotated in order to rotationally axially depress the preferably bead-like raised portion of the pump apparatus 112. Particularly preferably, the pump drive 202 and pump apparatus 112 together form a pump, in particular in the manner of a hose pump or peristaltic pump and/or a metering pump, for the fluid system 103 and/or the cartridge 100.

Particularly preferably, the pump is constructed as described in German Patent DE 10 2011 015 184 B4 and corresponding U.S. Pat. No. 8,950,424. However, other structural solutions are also possible.

Preferably, the capacity and/or discharge rate of the pump can be controlled and/or the conveying direction of the pump and/or pump drive 202 can be switched. Preferably, fluid can thus be pumped forwards or backwards as desired.

The analysis system 1 or analysis device 200 preferably comprises a connection apparatus 203 for in particular electrically and/or thermally connecting the cartridge 100 and/or the sensor arrangement or sensor apparatus 113.

As shown in FIG. 1, the connection apparatus 203 preferably comprises a plurality of electrical contact elements 203A, the cartridge 100, in particular the sensor arrangement or sensor apparatus 113, preferably being electrically connected or connectable to the analysis device 200 by the contact elements 203A.

The analysis system 1 or analysis device 200 preferably comprises one or more temperature-control apparatus 204 for temperature-controlling the cartridge 100 and/or having a thermal effect on the cartridge 100, in particular for heating and/or cooling, the temperature-control apparatus 204 (each) preferably comprising or being formed by a heating resistor or a Peltier element.

Individual temperature-control apparatus, some of these apparatus or all of these apparatus can preferably be positioned against or abutted on the cartridge 100, the main body 101, the cover 102, the sensor arrangement, sensor apparatus 113 and/or individual cavities and/or can be thermally coupled thereto and/or can be integrated therein and/or in particular can be operated or controlled electrically by the analysis device 200. In the example shown, in particular the temperature-control apparatus 204A-C are provided.

Preferably, the temperature-control apparatus 204A, referred to in the following as the reaction temperature-control apparatus 204A, is assigned to one of the reaction cavities 109A-C or to a plurality of reaction cavities 109A-C, in particular in order for it to be possible to carry out one or more amplification reactions therein.

The reaction cavities 109A-C are preferably temperature-controlled simultaneously and/or uniformly, in particular by means of one common reaction temperature-control apparatus 204A or two reaction temperature-control apparatus 204A.

More particularly preferably, the reaction cavity/cavities 109A-C can be temperature-controlled from two different sides and/or by means of two or the reaction temperature-control apparatus 204A that are preferably arranged on opposite sides.

Alternatively, each reaction cavity 109A-C can be temperature-controlled independently and/or individually.

The temperature-control apparatus 204B, referred to in the following as the intermediate temperature-control apparatus 204B, is preferably assigned to the intermediate temperature-control cavity 110 and/or is designed to (actively) temperature-control or heat the intermediate temperature-control cavity 110 and/or a fluid located therein, in particular the amplification products, preferably to a preheat temperature.

The intermediate temperature-control cavity 110 and/or intermediate temperature-control apparatus 204B is preferably arranged upstream of or (immediately) before the sensor arrangement or sensor apparatus 113, in particular in order for it to be possible to temperature-control or preheat, in a desired manner, fluids to be fed to the sensor arrangement or sensor apparatus 113, in particular analytes A and/or amplification products, particularly preferably immediately before said fluids are fed.

Particularly preferably, the intermediate temperature-control cavity 110 or intermediate temperature-control apparatus 204B is designed or provided to denature the sample P or analytes A and/or the amplification products produced, and/or to divide any double-stranded analytes A or amplification products into single strands and/or to counteract premature bonding or hybridizing of the amplification products, in particular by the addition of heat.

Preferably, the analysis system 1, analysis device 200 and/or the cartridge 100 and/or one or each temperature-control apparatus 204 comprise/comprises a temperature detector and/or temperature sensor (not shown), in particular in order to make it possible to control and/or feedback control the temperature.

One or more temperature sensors may for example be assigned to the sensor portions 116 and/or to individual channel portions or cavities, i.e., may be thermally coupled thereto.

The temperature-control apparatus 204C, referred to in the following as the sensor temperature-control apparatus 204C, is in particular assigned to the sensor apparatus 113 and/or is designed to (actively) temperature-control or heat fluids located in or on the sensor arrangement or sensor apparatus 113, in particular analytes A and/or amplification products, reagents or the like, in a desired manner, preferably to a hybridization temperature.

The analysis system 1 or analysis device 200 preferably comprises one or more valve actuators 205A, B for actuating the valves 115A, 115B. Particularly preferably, different (types or groups of) valve actuators 205A and 205B are provided which are assigned to the different (types or groups of) valves 115A and 115B for actuating each of said valves, respectively.

The analysis system 1 or analysis device 200 preferably comprises a control apparatus 207 for controlling the sequence/procedure of a test or assay and/or for collecting, evaluating and/or outputting or providing measured values in particular from the sensor apparatus 113, and/or test results and/or other data or values.

The control apparatus 207 preferably comprises an internal clock or time base by means of which the sequence/procedure of the test is or can be controlled and/or by means of which test steps that temporally follow one another or that extend over time are controlled or can be controlled by the control apparatus 207.

The control apparatus 207 preferably controls or is designed to control actuators of the analysis device 200 for acting on the cartridge 100 in order to carry out the test. The actuators are in particular the pump drive 202, the temperature-control apparatus 204 and/or the valve actuators 205A, B.

The analysis system 1 or analysis device 200 preferably comprises one or more sensors 206A-H.

In particular, one or more fluid sensors 206A are designed or provided to detect liquid fronts and/or flows of fluid in the fluid system 103.

Particularly preferably, the fluid sensors 206A are designed to measure or detect, for example optically and/or capacitively, a liquid front and/or the presence, the speed, the mass flow rate/volume flow rate, the temperature and/or another value of a fluid in a channel and/or a cavity, in particular in a respectively assigned sensor portion 116, which is in particular formed by a planar and/or widened channel portion of the fluid system 103.

The fluid sensor or sensors 206A preferably measure a fluid or a liquid entering or leaving the sensor portion 116 and/or a content change or fluid change in the sensor portion 116, and in the process generates a measurement result 706A that corresponds to the fluid entering, the fluid leaving, the content change and/or the fluid change in the sensor portion 116.

This measurement result 706A from the fluid sensor 206A can be retrieved by the control apparatus 207 and/or transmitted to the control apparatus 207. The control apparatus 207 controls or is designed to control the test and/or the actuators, preferably using or taking into account the measurement result 706A from the fluid sensor 206A.

In particular, when a content change, an entering fluid, a leaving fluid and/or a fluid change is detected in the sensor portion 116, in particular when a liquid front is detected, the control apparatus 207 influences a program sequence. In this case, for example a control can be carried out or a subsequent step of the test can be controlled, in particular by activating the actuators in a particular and/or differing manner.

Particularly preferably, the sensor portions 116 are each oriented and/or incorporated in the fluid system 103 and/or fluid flows against or through the sensor portions 116 such that, in the operating position of the cartridge 100, fluid flows through the sensor portions 116 in the vertical direction and/or from the bottom to the top, or vice versa, in particular in order to make it possible or easier to accurately detect liquid.

Alternatively, or additionally, the analysis device 200 preferably comprises one or more (different, other and/or further) sensors 206B-206H which preferably generate or are designed to generate measurement results 706 A-H.

The further sensor 206B can be a pressure sensor for determining the (relative) air pressure.

Alternatively, or additionally, one or more temperature sensors 206C are provided for detecting the internal temperature and/or the temperature in the interior space 212A of the analysis device 200, in particular the temperature of an atmosphere in the interior space 212A.

Alternatively, or additionally, one or more temperature sensors are provided for detecting the ambient temperature and/or the temperature of an atmosphere surrounding the analysis device 200 and/or the temperature of one or more of the temperature-control apparatus 204.

The analysis device 200 preferably comprises a tilt sensor 206D for detecting the inclination and/or orientation of the analysis device 200 and/or of the cartridge 100.

The analysis device 200 may comprise an acceleration sensor 206E. The acceleration sensor 206E is preferably designed to determine an acceleration of the analysis device 200, in particular an acceleration in the vertical and/or horizontal direction with respect to the operating position.

The analysis device 200 may comprise a humidity sensor 206F for determining the (relative) atmospheric humidity and/or the dew point of the atmosphere inside or in the interior space 212A and/or outside the analysis device 200.

The analysis device 200 may comprise a position sensor 206G for determining the position or location, for example by means of a GPS sensor. The position sensor 206G is preferably designed to determine the location of the analysis device 200 in space, in particular on the Earth's surface, and/or to output the geographical position, the location and/or the coordinates of the analysis device 200.

The analysis device 200 may comprise a cartridge sensor 206H for determining or checking the position or alignment of the cartridge 100 in or with respect to the analysis device 200.

The control apparatus 207 controls or is designed to control the test and/or the actuators, preferably using or taking into account one or more of the measurement results 706A-706H from the sensors 206A-206H. In this case, the control apparatus 207 preferably controls or feedback controls the actuators of the analysis device 200 in such a way that said actuators act on the cartridge 100 in order for the test to be carried out. In particular, the control apparatus 207 controls the pump drive 202, the temperature-control apparatus 204 and/or the valve actuators 205, in particular taking into account or depending on one or more of the measurement results 706A-706H from the sensors 206A-206H.

The flows of fluid are controlled in particular by accordingly activating the pump or pump apparatus 112 and actuating the valves 115A, 115B. Particularly preferably, the pump drive 202 comprises a stepper motor, or a drive calibrated in another way, such that desired metering can be achieved, at least in principle, by means of appropriate activation.

Additionally, or alternatively, the fluid sensors 206A are used to detect liquid fronts or flows of fluid, in particular in cooperation with the assigned sensor portions 116, in order to achieve the desired fluidic sequence and the desired metering by accordingly controlling the pump or pump apparatus 112 and accordingly activating the valves 115A, 115B.

Optionally, the analysis system 1 or analysis device 200 comprises an input apparatus 208, such as a keyboard, a touch screen or the like, and/or a display apparatus 209, such as a screen.

The analysis system 1 or analysis device 200 preferably comprises at least one interface 210, for example for controlling, for communicating and/or for outputting measured data/measurement results 713 or test results and/or for linking to other devices, such as a printer, an external power supply or the like. This may in particular be a wired or wireless interface 210.

The analysis system 1 or analysis device 200 preferably comprises a power supply 211, preferably a battery or an accumulator, which is in particular integrated and/or externally connected or connectable. Preferably, an integrated accumulator is provided as a power supply 211 and can be (re)charged by an external and/or internal charging device (not shown) via a connection 211A and/or is interchangeable.

The analysis system 1 or analysis device 200 preferably comprises a housing 212, all the components and/or some or all of the apparatus preferably being integrated in the housing 212. Particularly preferably, the cartridge 100 can be inserted or slid into the housing 212, and/or can be received by the analysis device 200, through an opening 213 which can in particular be closed, such as a slot or the like.

The analysis system 1 or analysis device 200 is preferably portable or mobile. Particularly preferably, the analysis device 200 weighs less than 25 kg or 20 kg, particularly preferably less than 15 kg or 10 kg, in particular less than 9 kg or 6 kg.

The fluidic, in particular pneumatic, coupling between the cartridge 100 and the analysis device 200 will be explained in greater detail in the following, it being possible for the following aspects to be implemented independently from the preceding aspects.

As already explained, the analysis device 200 can preferably be pneumatically linked to the cartridge 100, in particular to the sensor arrangement or sensor apparatus 113 and/or to the pump apparatus 112.

Particularly preferably, the analysis device 200 is designed to supply the cartridge 100, in particular the sensor arrangement or sensor apparatus 113 and/or the pump apparatus 112, with a working medium, in particular gas or air.

Preferably, the working medium can be compressed and/or pressurized in the analysis device 200 or by means of the analysis device 200.

Preferably, the analysis device 200 comprises a pressurized gas supply 214 for this purpose, in particular a pressure generator or compressor, preferably in order to compress and/or pressurize the working medium.

The pressurized gas supply 214 is preferably integrated in the analysis device 200 or the housing 212 and/or can be controlled or feedback controlled by means of the control apparatus 207. The pressurized gas supply 214 can also, at least in part, be formed on or by the cartridge 100.

Preferably, the pressurized gas supply 214 is electrically operated or can be operated by electrical power. In particular, the pressurized gas supply 214 can be supplied with electrical power by means of the power supply 211.

The analysis device 200 or pressurized gas supply 214 is preferably designed to compress the working medium to a pressure of more than 100 kPa, particularly preferably more than 150 kPa or 250 kPa, in particular more than 300 kPa or 350 kPa, and/or of less than 1 MPa, particularly preferably less than 900 kPa or 800 kPa, in particular less than 700 kPa and/or to feed said medium to the cartridge 100 at said pressure.

Preferably, air can be drawn in, in particular from the surroundings, as the working medium by means of the analysis device 200 or pressurized gas supply 214. In particular, the analysis device 200 or pressurized gas supply 214 is designed to use the surroundings as a reservoir for the working medium or the air. However, other solutions are also possible here, in particular those in which the analysis device 200 or pressurized gas supply 214 comprises a preferably closed or delimited reservoir, such as a tank or container, comprising the working medium, and/or is connected or connectable thereto.

Preferably, the analysis device 200 or pressurized gas supply 214 comprises an inlet, the working medium in particular being able to be drawn in and/or conducted in the pressurized gas supply 214 via the inlet.

Preferably, the analysis device 200 or pressurized gas supply 214 comprises a filter, the filter preferably being integrated in the inlet and/or it preferably being possible for the working medium to be filtered by means of the filter and/or it preferably being possible for particles to be separated from the working medium by means of the filter.

The filter is preferably designed as a micro filter or as a fine particulate air filter. Preferably, particles having a particle diameter of more than 10 μm, particularly preferably more than 8 μm or 9 μm, in particular more than 6 μm or 7 μm, more particularly preferably more than 4 μm or 5 μm, can be separated by means of the filter, the particle diameter preferably being the maximum or average diameter of the respective particles. This ensures that the channels or lines in the cartridge that convey the working medium do not become contaminated or clogged and/or that no undesired pressure loss occurs.

The analysis device 200 or pressurized gas supply 214 preferably comprises a connection element 214A, in particular in order to pneumatically connect the analysis device 200 and/or pressurized gas supply 214 to the cartridge 100.

Figure 3:
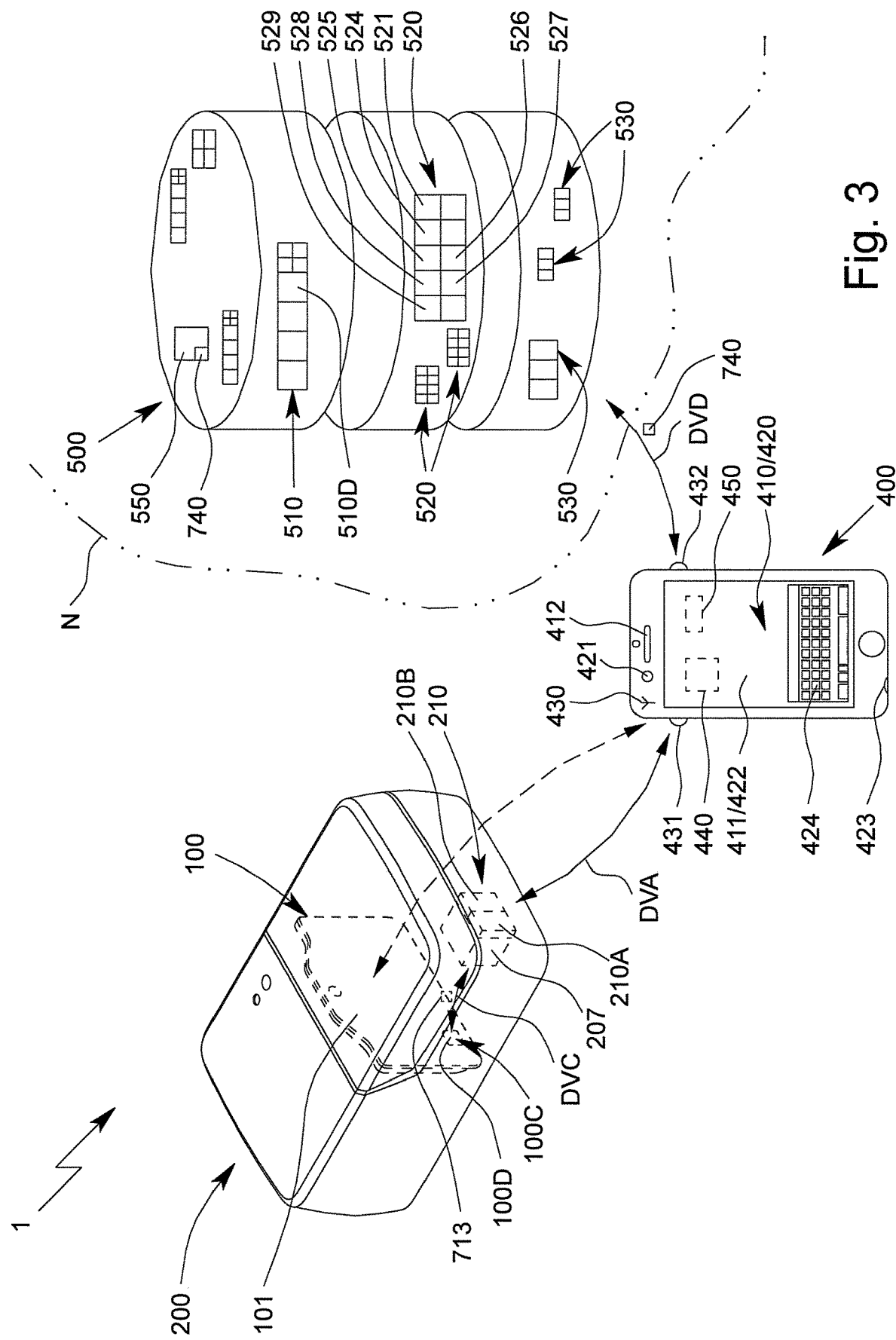
FIG. 3 is a schematic view of the proposed analysis system.

FIG. 3 is a schematic view of the proposed analysis system 1 for testing an in particular biological sample P, comprising the analysis device 200 for receiving the cartridge 100 and subsequently carrying out the test using the received cartridge 100, and an operating instrument 400 for the analysis device 200.

The operating instrument 400 is preferably designed to control the analysis device 200. Alternatively, or additionally, the operating instrument 400 can receive or retrieve information, in particular (measurement) results such as measured values, from the analysis device 200. In particular, the operating instrument 400 is a mobile terminal device such as a smartphone, a tablet or the like.

The term "operating instrument" is preferably understood to mean an apparatus by means of which the analysis device 200 can be controlled, control information 510 can be transmitted to the analysis device 200, and/or measurement results 713 can be received from the analysis device 200 and/or measurement results 713 can be evaluated. Preferably, the operating instrument 400 is or forms a user interface for controlling the test and/or the evaluation or outputting of measurement results 713.

The operating instrument 400 can alternatively be called operator control instrument. The operating instrument 400 preferably is configured to be operated by an operator (user) for controlling, in particular of the analysis device 200, the test and/or the evaluation. Thus, the operating instrument 400 is or comprises a user interface for input of commands and transfer of pieces of control information 510 to the analysis device 200.

The operating instrument 400 preferably comprises an input apparatus 420 for controlling the analysis device 200, for controlling data transmission and/or for controlling the evaluation of measurement results 713. Alternatively, or additionally, the operating instrument 400 comprises an output apparatus 410 for outputting, in particular displaying, information, in particular status information, operating elements and/or results. The operating instrument 400 preferably comprises a processor, microcontroller and/or memory for executing a computer program product for data transmission, for control and/or for evaluating measurement results.

Particularly preferably, the operating instrument 400 is a mobile terminal device, in particular for a radio and/or mobile network, such as a smartphone, tablet computer, mobile telephone or the like. The operating instrument 400 can preferably be operated independently from a power network, using a power storage means, in particular a (rechargeable) battery, and in a mobile manner, autonomously of and/or independently from further components of the analysis system, in particular the analysis device 200. The operating instrument 400 preferably comprises one or more interfaces for wireless data communications, in particular a WPAN communication interface, a WLAN communication interface, a near-field communication interface, an optical communication interface such as a camera, and/or a mobile radio interface.

The operating instrument 400 is preferably implemented or provided so as to be physically separated from the analysis device 200. The operating instrument 400 can preferably be separated and/or disconnected from the analysis device 200 physically and/or with respect to a data connection. The operating instrument 400 can preferably be wirelessly connected to the analysis device 200. A data connection DVA can thus be established between the analysis device 200 and the operating instrument 400. However, the data connection DVA can in principle also be established in another manner, for example wired.

It is preferable for the operating instrument 400 to also be operational when separated or disconnected from the analysis device 200, in particular for carrying out evaluations or for other purposes. Alternatively, or additionally, the analysis device 200 is also operational when separated or disconnected from the operating instrument 400, in particular for continuing a test.

Particularly preferably, the operating instrument 400 comprises an interface 430 for establishing data connections DVA, DVD.

The interface 430 and/or the operating instrument 400 in particular comprises what is referred to as an analysis device interface 431 that is designed to establish the preferably wireless data connection DVA to the analysis device 200. This can, for example, be a radio interface, WPAN interface, Bluetooth interface and/or a Bluetooth module or the like.

The interface 210 of the analysis device 200 preferably corresponds to the interface 430 and/or the analysis device interface 431 of the operating instrument 400, in particular such that the data connection DVA between the operating instrument 400 and the analysis device 200 can be established. The interface 210 of the analysis device 200 and the analysis device interface 431 preferably support the same data transmission method and/or radio transmission method or radio standard, in particular WLAN or WPAN methods such as Bluetooth, NFC, Zigbee or the like.

Particularly preferably, the interface 210 of the analysis device 200 and the analysis device interface 431 make possible or facilitate what is known as an ad-hoc connection. In this case, the data connection DVA is established preferably automatically when the devices, i.e., the operating instrument 400 and the analysis device 200, are within range of one another.

In order to control the test, it is preferable for precisely one data connection DVA to be provided between the analysis device 200 to be controlled and the operating instrument 400 controlling the analysis device 200, and/or for control information 510 to be received and/or accepted or to be acceptable and/or receivable and/or for measurement results 713, in particular measurement results 713 from the sensor apparatus 113, to be transmitted or to be transmittable only via precisely one data connection DVA between the analysis device 200 to be controlled and the operating instrument 400 controlling the analysis device 200.

The analysis device 200 preferably comprises a receiver 210A for, preferably wirelessly, receiving the control information 510 from the operating instrument 400. Preferably, the interface 210 comprises the receiver 210A, via which signals, in particular control information 510, are or can be received from the operating instrument 400.

Alternatively, or additionally, the analysis device 200 and/or the interface 210 comprises a transmitter 210B, via which data, in particular results such as measurement results 713 from the sensor apparatus 113, are or can be sent, particularly preferably to the operating instrument 400.

The interfaces 210, 431 preferably correspond to one another such that they support the same data transmission standard and/or radio standard, in particular Bluetooth, WLAN or the like. These interfaces are particularly preferably interfaces 210, 431 which make possible what is known as an ad-hoc connection, the data connection DVA preferably being established automatically when the devices, i.e., the operating instrument 400 and the analysis device 200, are within range of one another.

The analysis system 1 preferably further comprises a database 500 or the database 500 is assigned to the analysis system 1. The database 500 is preferably an external database 500 that is implemented or provided so as to be physically separated from the operating instrument 400 and/or from the analysis device 200. In principle, however, it is not impossible for the database 500 to be provided or implemented such that it can be directly linked, in particular to the operating instrument 400, or to be provided or implemented by the operating instrument 400.

The operating instrument 400 can access the database 500 via a data connection DVD. For this purpose, the operating instrument 400 and/or the interface 430 can comprise a database interface 432 by means of which the database 500 can be accessed, in particular via a network N. The network N may be the Internet or another data network. It is also preferable for the operating instrument 400 to be able to establish the data connection DVD to the database 500 via a wireless interface, in particular WLAN, WPAN, mobile communications or the like. However, in principle, other solutions are also possible here.

The analysis system 1, in particular the database 500, preferably comprises control information 510 by means of which the analysis device 200 can be controlled in order to carry out a testing (test procedure/assay).

The control information 510 preferably defines the actuation of the actuators of the analysis device 200 in a particular manner, such that the sample P is tested in the cartridge 100. In particular, actuators for carrying out the test can be or are controlled using the control information 510 such that said actuators act on the cartridge 100 and/or the sample P, in particular in a manner dependent on the specific cartridge 100, on a cartridge batch of the specific cartridge 100 and/or on the specific test.

Preferably, the analysis system 1 comprises calibration information 520 that can be stored in the database 500 and/or can be retrieved from the database 500. The calibration information 520 is preferably capable of influencing the test of the sample P, in particular depending on the specific cartridge 100, on a cartridge batch of the specific cartridge 100 and/or on the specific test.

The calibration information 520 is in particular default or basic settings, parameters and/or threshold values for sensors such as the sensor apparatus 113 of the cartridge 100, for one or more of the sensor(s) 206A-H of the analysis device 200 and/or for one or more of the actuators.

Calibration information 520 can be used in addition to control information 510 for carrying out the test, the calibration information 520 preferably influencing or specifying the control information 510. The calibration information 520 can be or can form the control information 510 or a part of the control information 510, even if this is not explicitly mentioned in the following.

The analysis device 200 can be calibrated and/or configured by calibration information 520 that can form part of the control information 510 or can be provided separately. For this purpose, the calibration information 520 can be determined, retrieved and/or transmitted to the analysis device 200 by means of the operating instrument 400.

In one example, fluid sensor calibration information 521 is provided which influences setting and/or evaluation of the fluid sensor 206A. The fluid sensor calibration information 521 is preferably dependent on the test to be carried out, the phase of the test and/or effects on the fluid sensor 206A of a content change in a sensor portion 116 that are to be expected in the test sequence, and/or contains different specifications which are dependent thereon.

Alternatively, or additionally, tilt sensor calibration information 524 can be provided, preferably comprising one or more threshold values 525, in particular a start threshold value 526 for blocking the start of a test if said threshold value is exceeded, and/or an interruption threshold value 527 for interrupting the test and/or for processing errors if said threshold is exceeded.

Alternatively, or additionally, sensor arrangement calibration information 528 can be provided, by means of which properties of the sensor arrangement 113 or sensor apparatus 113 are or can be set. In particular, it is provided that the sensor arrangement calibration information 528 is transmitted or can be transmitted to the sensor arrangement 113 or sensor apparatus 113 by the analysis device 200, and that the sensor arrangement 113 or sensor apparatus 113 carries out or is designed to carry out a measurement taking into account the sensor arrangement calibration information 528.

The proposed analysis system 1 preferably comprises evaluation information 530 which is in particular stored in the database 500 and/or is retrievable or can be retrieved from the database 500. The evaluation information 530 is preferably designed to be able to interpret measurement results 713 that originate from the cartridge 100, in particular from the sensor apparatus 113. For this purpose, measurement results 713 originating from the sensor apparatus 113 can be transmitted via a data connection DVC to the analysis device 200, which preferably transmits the measurement results 713 to the operating instrument 400 for evaluation.

The control information 510 and/or the evaluation information 530 particularly preferably comprises instructions, preferably in the form of an algorithm and/or for controlling a process on or using a processor or controller. The instructions preferably form a module that can be or is implemented by the analysis device 200 and/or the operating instrument 400, as a result of which the behavior of the analysis device 200 and/or the operating instrument 400 can be or is changed.

The instructions are in particular commands, machine code, pre-compiled source code or source code. The instructions preferably form a module-like software component, in particular a plugin. The instructions can be designed to form and/or to replace an (in particular exchangeable) module of the operating instrument 400 and/or of the analysis device 200. This module preferably contains instructions such as logic commands, loops and the like for controlling the test, in particular in the form of a computer program or computer program product. For this purpose, the control information 510 and/or the evaluation information 530 can comprise a (software) interface for coupling or implementation by the control apparatus 207 and/or an evaluation module 440, in particular of the operating instrument 400.

Alternatively, or additionally, the instructions can comprise parameters for configuring the control apparatus 207 and/or the evaluation module 440. These parameters are preferably provided in addition to the instructions, for example for the analysis device 200 in the form of or comprising the calibration information 520. Alternatively, the control information 510 and/or evaluation information 530 can however also merely comprise parameters and/or other information for the control and/or evaluation.

The evaluation module 440 is preferably formed by the operating instrument 400 or the operating instrument 400 comprises the evaluation module 440. By means of the evaluation module 440, measurement results 713 originating from the sensor apparatus 113 are evaluated using the evaluation information 530 and/or the evaluation module 440 is designed for this purpose.

Evaluation results 740 can preferably be generated by evaluating the measurement results 713, in particular by means of evaluation using the evaluation information 530.

The database 500 preferably comprises a results memory 550 in which results, in particular the measurement results 713 and/or evaluation results 740, can be stored and/or saved.

Within the meaning of the present invention, the term "database" should preferably be understood in a broad sense and also incorporates multi-part databases in particular. Therefore, in principle, the database 500 can be provided in different physical units or at different locations and/or can be composed of a plurality of subdatabases.

In order to control the test and/or the analysis device 200, the operating instrument 400 can retrieve control information 510 from the database 500 and transmit said information to the analysis device 200 in unaltered or altered form.

The operating instrument 400 is preferably designed to evaluate the measurement results 713 by means of the evaluation module 740 or in another manner, which measurement results can preferably be generated by the sensor apparatus 113 of the cartridge 100 while the sample P is being tested. For this purpose, it is provided that measurement result 713, which can originate from a sensor apparatus 113 of the cartridge 100 and/or which can be transmitted from the analysis device 200 to the operating instrument 400, are or can be evaluated in the operating instrument 400. For this purpose, the operating instrument 400 can retrieve or receive the evaluation information 530 from the database 500 and, using this evaluation information 530, evaluate the measurement results 713, in particular in the evaluation module 440 of the operating instrument 400.

The operating instrument 400 preferably comprises a memory 450. The memory 450 can be used to store, at least temporarily, control information 510, calibration information 520 and/or evaluation information 530, or the operating instrument 400 and the memory 450 can be designed for this purpose. Alternatively or additionally, the measurement results 713 and/or the evaluation results 740, that have been or can be generated from the measurement results 713 by means of the operating instrument 400, can be stored in the memory 450.

In one example, the operating instrument 400 comprises an output apparatus 410, preferably an in particular touch-sensitive screen or display 411 and/or a speaker 412. Alternatively or additionally, the operating instrument 400 comprises an input apparatus 420, in particular a camera 421, a touchpad 422, a microphone 423 and/or a keyboard 424.

The operating instrument 400 is preferably designed to display an operating interface or a user interface via the output apparatus 410, in particular the screen or display 411, or to provide in another way operating elements for controlling the test and/or the analysis device 200, and/or to output a status or other information relating to the test.

Alternatively, or additionally, commands can be received via the input apparatus 420, by means of which the operating instrument 400 starts, configures and/or controls the test of the sample P in a manner corresponding to the commands.

Preferably, the transmission of commands and/or information to the analysis device 200 is triggered via the input apparatus 420 or can be triggered by the input apparatus 420. In particular, transmission of the control information 510 from the operating instrument 400 to the analysis device 200 can be initiated or controlled via the input apparatus 420. Alternatively, or additionally, the analysis device 200 can be controlled, preferably by means of a command received via the input apparatus 420, in order to start the test.

The operating instrument 400 is preferably designed to transmit, to the analysis device 200, control information 510 for receiving or ejecting the cartridge 100. In this case, a cartridge 100 can in particular be accordingly controlled only when the operating instrument 400 is connected to the analysis device 200, whereupon the operating instrument 400 can verify the cartridge 100 and can optionally eject said cartridge or block a test if an error, such as incompatibility, is detected.

Alternatively, or additionally, the operating instrument 400 is designed to transmit a command for starting the test to the analysis device 200. The test is preferably started only by the command originating from the operating instrument 400. The analysis device 200 itself preferably does not comprise a user interface for generating a start command or for causing the test to start. This task is preferably reserved for the operating instrument 400.

The cartridge 100 preferably comprises at least one cartridge identifier 100C which corresponds to the cartridge 100 and/or to a batch with which the cartridge 100 is associated.

The cartridge identifier 100C is in particular a piece of information that is specific to the relevant cartridge 100, is in particular unique and/or is designed to uniquely identify the cartridge 100, such as an identification code which is assigned to the relevant cartridge 100 and makes it possible for said cartridge to be identified in a preferably unique manner.

Alternatively, or additionally, the cartridge identifier 100C makes it possible to assign the cartridge 100 to a production cycle and/or to a batch of particular cartridges 100. A batch is preferably characterized in that cartridges 100 are produced in the same continuous production cycle and/or are produced having the same components, in particular having identical sensor apparatus 113 and/or the same reagents and the like. There is preferably a plurality of batches which can differ from one another with regard to production periods, batches of starting materials used and the like, for example.

The cartridge identifier 100C can be stored and/or saved in a memory means 100D of the cartridge 100. The memory means 100D can be a barcode 124, an NFC tag and/or a memory which is provided in the sensor apparatus 113, is connected to the sensor apparatus 113 or is assigned to the sensor apparatus 113, or another apparatus for storing code or the like.

The cartridge identifiers 100C are preferably assigned to the respective cartridges 100. In particular, the cartridge identifier 100C is formed by the cartridge 100, connected thereto and/or arranged thereon.

The analysis system 1 can comprise one or a plurality of cartridges 100 which each can preferably be distinguished from one another by means of at least one cartridge identifier 100C and/or which are assigned to a batch.

Alternatively, or additionally, the same cartridge 100 can comprise at least two cartridge identifiers 100C that each correspond to the cartridge 100. The cartridge identifiers 100C can preferably be read out by different read-out methods, in particular optically, by radio, by a wired connection or the like.

The respective cartridges 100 can comprise two different memory means 100D having the same or corresponding cartridge identifiers 100C. The memory means 100D are preferably independent of one another and/or separated from one another physically. The memory means 100D can preferably be read out in different ways, in particular electronically and/or by an electronic connection on the one hand, and wirelessly, in particular optically and/or by radio on the other hand.

The cartridge identifier 100C is preferably used for determining, identifying and/or retrieving the control information 510, calibration information 520 and/or evaluation information 530. For this purpose, the cartridge identifier 100C can be transmitted to the database 500, whereupon the database 500 identifies and/or sends back the control information 510, calibration information 520 and/or evaluation information 530. In principle, however, other mechanisms are also possible, by means of which the control information 510, calibration information 520 and/or evaluation information 530 is identified, determined and/or retrieved on the basis of the cartridge identifier 100C.

Preferably, the cartridge identifier 100C is determined and/or read out by the operating instrument 400. Furthermore, the control information 510, the calibration information 520 and/or the evaluation information 530 is preferably retrieved using or by the operating instrument 400. The operating instrument 400 can preferably subsequently transmit the control information 510 for carrying out the test to the analysis device 200 and/or can evaluate the measurement results 713 on the basis of the evaluation information 530.

The operating instrument 400 can read out the cartridge identifier 100C from the memory means 100D directly, preferably wirelessly, in particular optically. Alternatively or additionally, the cartridge identifier 100C can be transmitted to the operating instrument 400 by the analysis device 200 that has previously received the cartridge identifier 100C from the cartridge 100, preferably in a wired manner, in particular read out said identifier, in particular via a wired data connection DVC.

Figure 4:
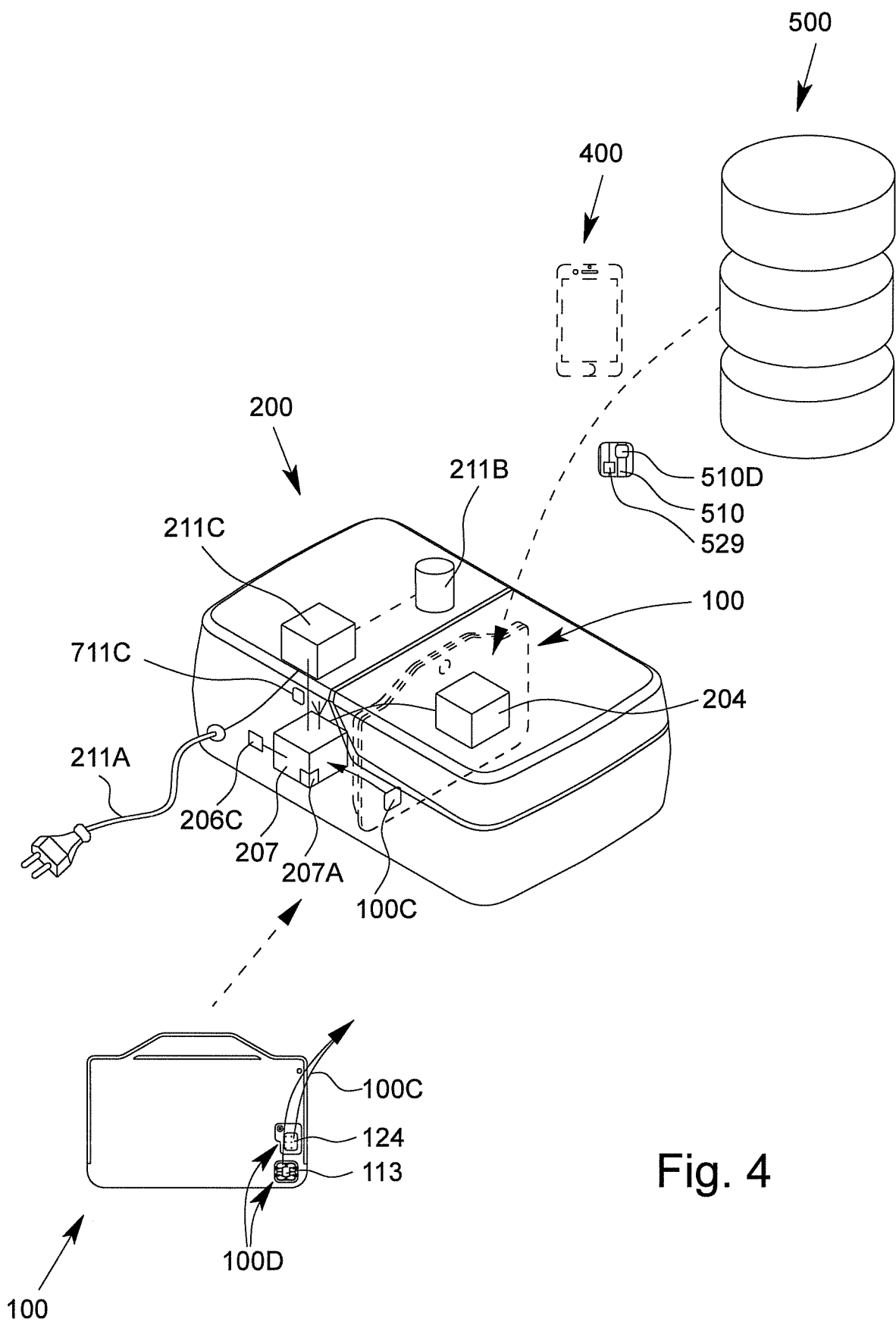
FIG. 4 is another schematic view of the proposed analysis system.

FIG. 4 is another schematic view of the proposed analysis system 1 for testing the in particular biological sample P.

The analysis system 1 comprises the cartridge 100 for receiving the sample P. Furthermore, the analysis system 1 comprises the analysis device 200 for receiving the cartridge 100 and subsequently carrying out the test using the received cartridge 100.

As shown schematically in FIG. 4, in one aspect, which can also be implemented independently, the analysis device 200 preferably comprises the energy storage means 211B. The energy storage means 211B is preferably designed to store and output electrical energy. Said storage means 211B is in particular an accumulator, a battery, a capacitor or the like.

An energy management module 211C is preferably associated with the energy storage means 211B. The energy storage means 211B is in particular connected to the energy management module 211C.

The energy management module 211C is designed to determine, to calculate, to estimate and/or to measure the amount of energy 711C contained in the energy storage means 211B. In particular, the energy management module 211C is designed to measure an electrical voltage that is present at the energy storage means 211B and/or electrical currents flowing into or out of the energy storage means 211B. The energy management module 211C can then determine the charge state and/or the amount of energy 711C contained in the energy storage means 211B from the measured values or in another manner.

FIG. 4 also schematically shows the control apparatus 207 of the analysis device 200. The control apparatus 207 is preferably designed to control and/or to feedback control and/or to supply electricity to actuators of the analysis device 200, in particular the temperature-control apparatus 204, which is shown merely as an example in FIG. 4.

Particularly preferably, the control apparatus 207 is designed to enable and/or to cause the test to be started and/or the actuators for testing the sample P to be controlled only provided that the amount of energy 711C remaining in the energy storage means 211B meets or exceeds an energy requirement 510D for the test.

Alternatively, or additionally, the control apparatus 207 is designed to stop, to block and/or to omit the start of the test and/or the control of actuators for carrying out the test if the amount of energy 711C remaining in the energy storage means 211B is below the energy requirement 510D.

The charge state of the energy storage means 211B and the amount of energy 711C contained in the energy storage means 211B preferably correspond to one another, it also being possible for the amount of energy 711C to be understood as or replaced by the charge state. Within the meaning of the present invention, the term "amount of energy 711C" should therefore preferably be understood in a broad sense and includes the charge state or a value corresponding thereto that can optionally be expressed in ampere-hours (when the voltage is specified) or watt-hours or a percentage with respect to the capacity of the energy storage means 211B, or the like.

The energy requirement 510D preferably corresponds to a desired charge state and/or desired value or minimum value for the charge state, or can be understood as such or replaced thereby, in particular in order for it to be possible to carry out the or a specific test. Within the meaning of the present invention, the term "energy requirement 510D" should therefore preferably be understood in a broad sense and includes a requirement for electrical energy or a desired charge state corresponding thereto or a value corresponding thereto that can optionally be expressed in ampere-hours (when the voltage is specified) or watt-hours or a percentage with respect to the capacity of the energy storage means 211B, or the like.

In other words, the test is therefore preferably enabled or triggered only if the charge state reaches or exceeds the desired charge state and/or the desired value or minimum value for the charge state, and/or the test is blocked if the charge state is below the desired charge state and/or the desired value or minimum value for the charge state.

For the sake of clarity, in the following the invention will always be described on the basis of the amount of energy 711C and the energy requirement 510D.

The amount of energy 711C is preferably determined by the energy management module 211C and/or provided as a value or electrically. Alternatively or additionally, the control apparatus 207 can determine or retrieve the amount of energy 711C, preferably using or from the energy management module 211C.

The analysis device 200, preferably the control apparatus 207, is preferably designed to receive or retrieve the energy requirement 510D as part of or separately from the control information 510. The energy requirement 510D is particularly preferably retrieved from the database 500 and/or by the operating instrument 400 and/or via the operating instrument 400 and/or can be transmitted to the analysis device 200 and/or the control apparatus 207.

For details regarding retrieving and/or receiving the control information 510, reference is made to the preceding explanations, the aspects explained for the control information 510 also being correspondingly applicable or transferrable to the energy requirement 510D, regardless of whether the energy requirement 510D is provided separately or as part of the control information 510.

Particularly preferably, the operating instrument 400 retrieves the energy requirement 510D from the database 500 and transmits the energy requirement 510D to the analysis device 200, in particular the control apparatus 207, in order to make possible the comparison with the remaining amount of energy 711C. Alternatively, or additionally, the amount to energy 711C can be provided to the operating instrument 400 which determines, e.g., by comparison with the energy requirement 510D, whether the remaining amount of energy 711C exceeds the energy requirement 510D. Then, the operating instrument sends only under the condition that the remaining amount of energy 711C exceeds the energy requirement the start command and/or control information 510 to the analysis device 200 or starts the testing by this or a different measure.

For this purpose, the operating instrument 400 can determine or receive the cartridge identifier 100C of the cartridge 100 and can retrieve the energy requirement 510D corresponding to the cartridge 100 or to the test supported by the cartridge 100 from the database 500 using the cartridge identifier 100C. This energy requirement 510D that corresponds to the cartridge 100 and/or test is then used by the analysis device 200 in the manner described in order to start the test and/or to block or enable the start of the test.

The analysis device 200, in particular the control apparatus 207, can furthermore render the start of the test dependent on a measurement result from one or more of the sensors 206A-H that is/are preferably designed to detect environmental and/or boundary conditions that relate to the analysis device 200. These include in particular temperature and/or inclination and/or acceleration and/or atmospheric humidity and/or position and/or the (correct) alignment of the cartridge 100 in the analysis device 200.

The energy requirement 510D can correspond to one or more specific tests, to a group of tests or to one or more, preferably different, cartridges 100 or tests using one or more cartridges 100. The energy requirement 510D is preferably specified or defined for the test that is to be carried out and/or for the cartridge 100 that is to be used, or is specified or defined depending on the test to be carried out and/or the cartridge 100 or batch used, for example as a value, indicator or the like.

The energy requirement 510D can be received, determined or calculated by the analysis device 200. The energy requirement 510D can be stored or, in particular as described above, received in a memory 207A of the analysis device 200.

In a preferred variant, the control apparatus 207 or the operating instrument 400 can determine or estimate the energy requirement 510D from the control information 510.

The energy requirement 510D is preferably compared with the amount of energy 711C, in particular by the analysis device 200, the control apparatus 207 and/or the operating instrument 400. For this purpose, it is possible for the energy requirement 510D and/or the amount of energy 711C to be transmitted to the operating instrument 400 and compared thereby with the amount of energy 711C. In principle, however, the comparison can also be carried out in another manner.

The test can be enabled or blocked using the result of the comparison of the energy requirement 510D with the amount of energy 711C. Alternatively or additionally, it is possible for the result to be output. In this case, the result can be output, in particular displayed, in particular by means of the operating instrument 400 or another user interface, as a value, symbol, graphic and/or as a recommendation for action or a user guidance instruction, animation or the like. In particular, the need to establish a connection to the energy network, the need to charge the energy storage means 211B and/or the need to exchange the energy storage means 211B is output or signaled.

Even when the analysis device 200 is connected to the mains power supply network, the test is preferably still only started or enabled if the test could also be carried out solely using the amount of energy 711C remaining in the energy storage means 211B. Following connection to the energy supply network, the test is therefore nonetheless enabled or started (in particular automatically) only if or as soon as the amount of energy 711C meets the energy requirement 510D. This ensures that the test can be completed even if there is an interruption in the external power supply.

Another aspect of the present invention, which can also be implemented independently, relates to the climate control of the analysis device 200. On account of its, in particular biological, nature, the test in particular requires boundary conditions such as temperature to be adhered to. In this case, the analysis system 1 is preferably designed to carry out the test at a temperature of the cartridge 100 and/or the analysis device 200 that is above (normal) room temperature of for example 20° C.

Figure 5:
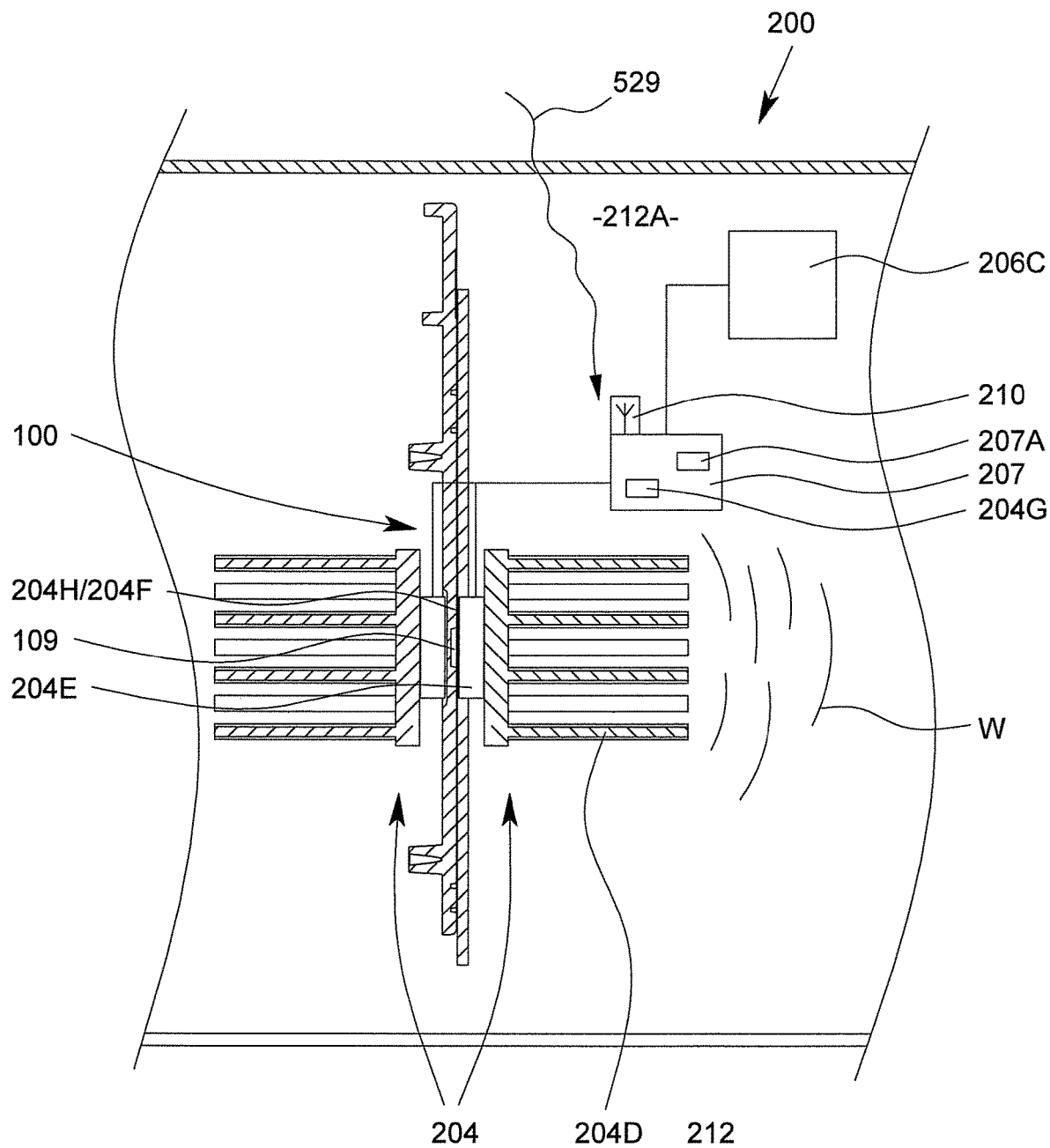
FIG. 5 is a highly schematic detail of the analysis device.

FIG. 5 is a highly schematic detail of the analysis device 200, in which the cartridge 100, the control apparatus 207 and at least one temperature-control apparatus 204 are arranged.

The temperature-control apparatus 204 is arranged inside the analysis device 200, i.e., is located in an interior space 212A of the analysis device 200, which space 212A is preferably delimited by the housing 212 of the analysis device 200.

The temperature-control apparatus 204 or a plurality of temperature control apparatus 204 is/are, as already explained in particular in conjunction with FIG. 1, designed for temperature-controlling the cartridge 100 and/or the sample P.

The temperature-control apparatus 204 is in particular designed or used to temperature-control a sample P located in the cartridge 100 and/or a fluid or other parts of the fluid system 103 of the cartridge 100 by being in direct contact with the cartridge 100.

In order to temperature-control the cartridge 100, a part of the temperature-control apparatus 204 that is in contact with or positioned against the cartridge 100 can be brought, in particular feedback controlled, to a specifiable temperature, in particular by means of the control apparatus 207. The temperature is transmitted to the cartridge 100 via the thermal coupling and can thus temperature-control the sample P, another fluid or other contents of the cartridge 100. For this purpose, the temperature-control apparatus 204 is spring-loaded or can be brought into direct contact with or positioned against the cartridge 100 in another manner during or following loading or insertion of the cartridge 100 into the analysis device 200.

The temperature-control apparatus 204 preferably comprises a temperature sensor 204F which, in the example shown, is provided on the side of the temperature-control apparatus 204 facing the cartridge 100, in particular is thermally connected to a Peltier element 204E or to another heating and/or cooling apparatus of the temperature-control apparatus 204, and/or is produced using thin-film technology.

Measured values from this temperature sensor 204F of the temperature-control apparatus 204 can be used to feedback control, in a control-loop system, the temperature at which the temperature-control apparatus 204 acts on the cartridge 100. For this purpose, the control apparatus 207 and/or the analysis device 200 may comprise a feedback-control apparatus 204G that determines the temperature of the temperature-control apparatus 204 using the temperature sensor 204F and feedback controls the Peltier element 204E or the other heating and/or cooling apparatus to a desired value. This can be achieved by the temperature measured by the temperature sensor 204F being compared, as an actual value, with the desired value for the temperature of the cartridge 100 and/or of the sample P, and the current and/or the voltage at the Peltier element 204E, or the power supply of the other heating and/or cooling apparatus, being feedback controlled as the manipulated variable. However, in principle, other solutions are also possible here. The temperature feedback control using the temperature sensor 204F of the temperature-control apparatus 204 is optional in the present aspect.

In the example shown, the temperature-control apparatus 204 comprises a thermal coupling element 204H that facilitates direct thermal connection of the temperature-control apparatus 204 to the cartridge 100. This may be a thermally conductive pad or the like. The temperature sensor 204F can be formed below, on and/or in the thermal coupling element 204H.

In the example shown, the temperature-control apparatus 204 comprises a heat sink 204D on the side facing away from the cartridge 100 in order to be able to conduct away or remove waste heat from the temperature-control apparatus 204. For this purpose, the heat sink 204D preferably comprises rib-like and/or bar-like structures for increasing the effective surface area for emitting heat W.

The control apparatus 207 is preferably designed to control and/or to feedback control the temperature-control apparatus 204.

In one aspect of the present invention, which can also be implemented independently, one or more temperature-control apparatus 204 designed for temperature-controlling the cartridge 100 is or are controlled depending on an interior space temperature of the analysis device 200, and/or the analysis device 200 is designed for this purpose.

In the example shown in FIG. 5, the analysis device 200 comprises a temperature sensor 206C that measures or can measure a temperature of the interior space 212A of the analysis device 200 as the interior space temperature. The interior space temperature is in particular an average and/or air temperature of the interior space 212A.

The temperature sensor 204F of the temperature-control apparatus 204 is preferably implemented or provided so as to be separated and/or thermally decoupled from a temperature sensor 206C for determining the interior space temperature.

The temperature sensor 206C for determining the interior space temperature is preferably thermally decoupled from both the temperature-control apparatus 204 and the cartridge 100 and/or preferably measures the air temperature and/or interior space temperature of the analysis device 200 or is designed, set up and/or arranged for this purpose. In other words, the temperature sensor 206C for determining the interior space temperature of the analysis device 200 is not in direct contact, in particular mechanically and/or thermally, with the temperature-control apparatus 204 and/or the cartridge 100.

Preferably, the temperature sensor 206C is separated from, spaced apart from, thermally decoupled from, and/or not in direct contact, in particular mechanically and/or thermally, with the temperature-control apparatus 204 and/or the cartridge 100, in particular during or at least during the determination or measurement of the interior space temperature.

The temperature sensor 206C is preferably designed and/or set up to generate, in particular to measure, the actual value of a feedback control for a temperature of the interior space 212A of the analysis device 200. For this purpose, the temperature sensor 206C is preferably in principle spaced apart from and/or thermally decoupled from heat sources of the analysis device 200.

In the example shown, the temperature sensor 206C is spaced apart from the temperature-control apparatus 204, including the heat sink 204D, and from the cartridge 100, so that heat W or cold generated by the temperature-control apparatus 204 only indirectly reaches or can reach the interior space 212A via air and/or the temperature sensor 206C via thermal radiation.

A plurality of temperature sensors 206C and/or a plurality of temperature-control apparatus 204 may also be provided, which are each thermally decoupled from one another. In this case, an average temperature can be formed as or can function as the actual value.

The temperature-control apparatus 204 that is designed for temperature-controlling the cartridge 100 is preferably controlled, in particular feedback controlled, depending on the interior space temperature of the analysis device 200. In other words, the temperature-control apparatus 204 is used other than intended and, instead of being used for temperature-controlling the cartridge 100, the sample P and/or the fluid system 103, the temperature-control apparatus 204 is or the or all the temperature-control apparatus 204 are used for temperature-controlling the interior space 212A, by the interior space temperature being used for the control and/or feedback control. In this case, waste heat is preferably generated by the temperature-control apparatus 204, by means of which the interior space 212A of the analysis device 200 is heated in order to achieve a desired interior space temperature for carrying out the test.

The analysis system 1 is preferably designed such that the test is or can be carried out at temperatures above (normal) room temperature, in particular at over 20° C., preferably over 25° C. or 30° C., in particular over 35° C., and/or below 60° C., preferably below 55° C. or 50° C. A particularly preferred temperature range for the interior space temperature is between 25° C. and 35° C. This design makes it possible for the analysis system 1 to be used in a highly universal manner, since cooling of the interior space 212A is generally not required, and the interior space 212A can be heated in a simple, cost-effective and resource-saving manner using the proposed method.

Since the temperature-control apparatus 204 required and/or already provided for temperature-controlling the cartridge 100 is/are used for temperature-controlling the interior space 212A, additional climate-control apparatus are not required. This is particularly advantageously the case in combination with the analysis system 1 designed or set up for carrying out the test at the interior space temperatures described.

In the example shown, the interior space temperature of the analysis device 200 is controlled, preferably feedback controlled, by the control apparatus 207. In this case, the control apparatus 207 receives the interior space temperature and/or a corresponding measurement result 706C from the temperature sensor 206C, compares said temperature/result with a desired value, i.e., a specified or specifiable interior space temperature, particularly preferably in the form of a temperature threshold value 529, referred to in the following as a temperature threshold value 529. The feedback control can also be implemented in another manner, however.

The interior space temperature is preferably changed, in particular increased, to the temperature threshold value 529. This can be achieved in the described manner by heating the interior space 212A using waste heat from the temperature-control apparatus 204. In principle, however, another climate-control and/or heating element, in particular a resistive heater, a refrigerating machine or the like, can be provided alternatively or in addition.

The interior space temperature is changed, in particular increased, preferably using the temperature-control apparatus 204, before the test is started and/or before the sample P is conveyed on the cartridge 100. This makes it possible for the test to always be carried out under suitable climatic conditions, which is conducive to the reliability of the test.

The control apparatus 207 can feedback control the interior space temperature by means of a desired value/actual value comparison. In this case, upon identification of an interior space temperature that is below the temperature threshold value 529, the temperature-control apparatus 204 can be operated such that the temperature-control apparatus 204 heats the interior space 212A of the analysis device 200 until the interior space temperature reaches or exceeds the temperature threshold value 529.

The test is preferably only started and/or the sample P is preferably only conveyed and/or treated on the cartridge 100 if the interior space temperature of the interior space 212A has reached or exceeded the temperature threshold value 529, and/or the analysis device 200 is designed for this purpose. In other words, the test or the start of the test is preferably prevented and/or blocked until the temperature threshold value 529 has been reached or exceeded.

Particularly preferably, the temperature threshold value 529 is or can be defined and/or stored according to or individually for a specific test and/or cartridge 100, or the analysis system 1 is designed for this purpose. There can therefore be different temperature threshold values 529 for different cartridges 100 and/or tests, the values 529 being determined, retrieved and/or used depending on or according to the test to be carried out and/or the cartridge 100 to be used.

The temperature threshold value 529 can be part of the control information 510 or calibration information 520. The temperature threshold value 529 can be stored, determined, retrieved and transmitted, etc., as part of the control information 510 or calibration information 520, in particular as described above, or can be provided separately from the control information 510 and/or calibration information 530. The explanations in this regard therefore apply accordingly to the temperature threshold value 529 per se and as part of the calibration information 520 or the control information 510.

In particular, the temperature threshold value 529 can be stored in the database 500 and/or can be retrieved from the database 500. The method and the apparatus preferably used therefor are preferably the same as those for retrieving and/or receiving the control information 510 and/or the energy requirement 510D, as described in conjunction with FIGS. 3 and 4.

With respect to the temperature threshold value 529, it is therefore also preferable for the operating instrument 400 to identify said value using the cartridge identifier 100C and/or to retrieve said value from the database 500, and to transmit said value to the analysis device 200, in particular the control device 207 and/or via the interface 210. Alternatively, the operating instrument can receive the interior space temperature and compares it with the temperature threshold value 529. Only if this temperature threshold value 529 exceeded by the interior space temperature, a start command is or can be transmitted from the operating instrument 400 to the analysis device 200 for starting the test.

Alternatively, or additionally, temperature threshold values 529 could, however, also be stored in advance for different cartridges 100 and/or analysis devices 200, in particular saved in the memory 207A of the analysis device 200. Said threshold values 529 can be identified while or by means of loading the cartridge 100 and can be used for controlling, feedback controlling and/or setting the interior space temperature.

In principle, the temperature-control of the interior space 212A can also be carried out, deviating from the temperature-control apparatus 204, using another climate-control apparatus by means of the desired value/actual value comparison and/or by means of the control apparatus 207 on the basis of the temperature threshold value 529.

The aspect whereby the temperature of the interior space 212A is feedback controlled to the temperature threshold value 529 or controlled using the temperature threshold value 529 that is stored in the database 500, retrieved by the operating instrument 400, determined by the cartridge identifier 100C and/or transmitted to the analysis device 200 and preferably used for feedback controlling a temperature of the analysis device 200 is therefore also achievable and advantageous independently of the temperature-control of the interior space 212A, using one or more of the temperature-control apparatus 204.

For the sake of simplicity, however, in the following the method for temperature-controlling the interior space 212A is described merely in conjunction with the temperature-control apparatus 204 that is preferably used for temperature-controlling, in particular heating, the interior space 212A.

The temperature threshold value 529 can also be/comprise a desired temperature value and/or a desired temperature range. The interior space temperature can be feedback controlled, in particular by feedback controlling an addition of heat inside the analysis device 200 depending on the interior space temperature and/or the measured value 706C from the temperature sensor 206C.

In one aspect, the temperature-control apparatus 204, the Peltier element 204E of the temperature-control apparatus 204, and/or the interior space temperature is/are controlled, in particular feedback controlled, by operating the Peltier element 204E cyclically. This is preferably intended to mean that an alternating current, i.e., a current having a change of sign, is applied to the Peltier element 204E, and/or the Peltier element 204E is operated with alternating polarities such that the same side of the Peltier element 204E is alternately heated and cooled. In this case, overall, on account of the finite efficiency which, in Peltier elements 204E, is usually approximately 50%, waste heat is generated that causes the interior space 212A to be heated.

The cyclical operation of the Peltier element 204E means that the Peltier element 204E, which is preferably already in contact with the cartridge 100 and/or thermally coupled to the cartridge 100, and/or the temperature-control apparatus 204 does not overheat and/or excessively cool the cartridge 100.

It is possible, in principle, for Peltier elements 204E to be able to generate temperatures or temperature differences of over 40° C. for example. It is therefore conceivable for the cartridge 100 to fall below the dew point or freezing point, to become brittle and/or to be overheated, to melt or to be damaged in another manner or, in any case, to be adversely affected, when the temperature-control apparatus 204 is being used for temperature-controlling the interior space 212A. The cyclical actuation of the Peltier element 204E makes it possible for the temperatures of the cartridge 100 to remain in an acceptable range.

At the same time, however, the temperature-control apparatus 204 is also supplied with as much energy as possible in order to maximize the waste heat. As an alternative or in addition to the cyclical operating mode, it is also preferable here to cool the cartridge 100 relative to the interior space temperature, in particular substantially constantly and/or to a constant temperature, using the temperature-control apparatus 204. In this case, heat is returned to the cartridge 100 via the interior space 212A, which results in the cooled side of the temperature-control apparatus 204 facing the cartridge 100 to be heated, which leads to an increased generation of heat and/or a stronger heating of the side of the temperature-control apparatus 204 remote from the cartridge 100, and thus supports or facilitates the generated amount of heat W and thus rapid heating of the interior space 212A.

Alternatively, or additionally, the temperature-control apparatus 204 is feedback controlled or controlled such that the side of the temperature-control apparatus 204 facing the cartridge does not leave a specific temperature range. In particular, a minimum temperature and/or maximum temperature can be specified or provided.

The temperature-control apparatus 204 can be feedback controlled such that in particular the side facing the cartridge 100 does not fall below the minimum temperature. The minimum temperature may correspond to the dew point of the atmosphere in the interior space 212A of the analysis device 200 or may take account of this dew point. The dew point can be determined using the temperature sensor 206C and/or the (atmospheric) humidity sensor 206F, in particular by means of the analysis device 200. This prevents the formation of condensation. Alternatively, or additionally, the Peltier element 204E is operated such that none of the sides falls below 0° C., in order to prevent icing.

Alternatively, or additionally, the temperature-control apparatus 204 can be feedback controlled such that in particular the side facing the cartridge 100 does not exceed the maximum temperature. The maximum temperature may take account of the structure of and/or the materials used in the cartridge 100. The maximum temperature is preferably selected such that the cartridge 100 is not damaged.

The minimum temperature and/or maximum temperature can be part or form part of the control information 510 and/or calibration information 520, or can be processed in a corresponding manner and/or can have corresponding properties, as described above.

This control and/or feedback control can be carried out by the temperature-control apparatus 204 in addition to the control and/or feedback control of the interior space temperature, in particular as a boundary condition or boundary conditions for feedback controlling the interior space temperature.

For temperature-controlling the sample P, the temperature-control apparatus 204 is preferably operated such that the side of the temperature-control apparatus 204 coupled to the cartridge 100 heats the cartridge 100 and cools the heat sink 204D, whereas, in order to temperature-control, in particular heat, the interior space 212A, the temperature-control apparatus 204 is preferably operated such that the cartridge 100 is cooled and the heat sink 204D is heated, particularly preferably on average or with a mean value during varied operation and/or during varied control of the temperature-control apparatus 204. The cartridge 100 is therefore preferably cooled to below the interior space temperature in order to temperature-control the interior space 212A.

Alternatively, or additionally, it is in principle also possible for the temperature-control apparatus 204 to be controlled such that the cartridge 100 is heated and, consequently, the heat sink 204D is cooled. In this case too, overall, on account of the dissipated power of the Peltier element 204E, more heat is generated than cold, as a result of which the interior space temperature can be increased overall. On account of the minimal coupling of the region of the cartridge 100 temperature-controlled by the temperature-control apparatus 204 to the surroundings, i.e., the interior space 212A, although this variant is possible, it is less preferred for temperature-controlling the interior space 212A.

It is further preferable for the test to be started automatically if the interior space temperature reaches or exceeds the temperature threshold value 529. It is therefore possible for a test to start automatically, in a temperature-dependent manner. From another perspective, the temperature-control of the interior space 212A can also precede the test or can form part of the test, preferably the start of the test.

The temperature-control of the interior space 212A using the temperature-control apparatus 204 is preferably carried out exclusively before the start of the test on the sample P, in particular before the sample P is conveyed, treated and/or prepared inside the cartridge 100 and/or fed to a sensor apparatus 113 of the cartridge 100. During execution of the test on the sample P, during which the sample P is conveyed, the temperature-control apparatus 204, in contrast, is preferably used for temperature-controlling the sample P, the temperature of the sample P and/or the cartridge 100 or the fluid system 103 being specified and/or feedback controlled by the temperature-control apparatus 204, in particular as already explained above.

In general, the analysis device 200, the cartridge 100 or in particular the sensor apparatus 113 may measure, detect or identify the one or more analytes A by means of specific bonding, in particular by means of capture molecules and/or of means of electrochemical detection such as redox cycling, or the like, preferably performed on the cartridge 100 and/or in the sensor apparatus 113. Preferably, the capture molecules are arranged or immobilized on a sensor array or on sensor fields or electrodes of the sensor apparatus 113. In particular, an immuno-assay or a protein assay for detecting or identifying a protein and/or a nucleic-assay for detecting or identifying a nucleic-acid sequence can be or is realized.

Alternatively, or additionally, measurements without specific bonding and/or without electrochemical detection can be used or performed, preferably in or by the analysis device 200 and/or cartridge 100. Such measurements can include an optical measurement, impedance measurement, capacitance measurement, spectrometric measurement, mass spectrometric measurement, or the like. For this purpose, the analysis device 200 or cartridge 100 may comprise an optical spectrometer and/or allow optical measurements of the treated or untreated sample P. Thus, it is possible to measure, detect or identify other or further analytes A, compounds, material characteristics, or the like of the sample P, e.g., within the cartridge 100 or any other sample carrier. These alternative or additional measurements can be used or processed and/or evaluated in a similar manner as described or differently.

Individual aspects and features of the present invention and individual method steps and/or variants of the method may be implemented independently from one another, but also in any desired combination and/or order.

In particular, the present invention relates also to any one of the following aspects which can be realized independently or in any combination, also in combination with any aspects described above.

1. Method for controlling an analysis device 200, the analysis device 200 being designed for testing an in particular biological sample P, the sample P preferably being able to be received in a cartridge 100 and the analysis device 200 being designed for receiving the cartridge 100 and subsequently carrying out the test using the received cartridge 100, characterized
in that, before the start of the test, the amount of energy 711C remaining in an energy storage means 211B of the analysis device 200 is compared with an energy requirement 510D for the test, and the test is only started if the amount of energy 711C meets the energy requirement 510D, and/or
in that a temperature-control apparatus 204 designed for temperature-controlling the cartridge 100 is controlled depending on an interior space temperature of the analysis device 200.

2. Method according to aspect 1, characterized in that the energy requirement 510D is defined depending on the test to be carried out and/or the cartridge 100 to be used.

3. Method according to either aspect 1 or 2, characterized in that the energy requirement 711C is established, retrieved or determined using an identifier 100C that corresponds to the cartridge 100 and/or on the basis of the test to be carried out.

4. Method according to any one of the preceding aspects, characterized in that control information 510 for carrying out the test comprises the energy requirement 510D or the energy requirement 510D is determined using the control information 510.

5. Method according to any one of the preceding aspects, characterized in that the control information 510 and/or the energy requirement 510D is retrieved or determined using an identifier 100C that corresponds to the cartridge 100.

6. Method according to any one of the preceding aspects, characterized in that the interior space temperature is measured using a temperature sensor 206C that is not directly in contact with the temperature-control apparatus 204 and/or the cartridge 100.

7. Method according to any one of the preceding aspects, characterized in that the interior space temperature is changed using the temperature-control apparatus 204 before the test is started and/or the sample P is conveyed.

8. Method according to any one of the preceding aspects, characterized in that the interior space temperature is controlled or feedback controlled using the temperature-control apparatus 204, the interior space 212A of the analysis device 200 preferably being heated using waste heat from the temperature control apparatus 204, and/or the feedback control using the temperature threshold value as the desired value, the interior space temperature as the actual value and the temperature-control apparatus 204 as the control element, and/or a minimum temperature and/or maximum temperature of the temperature-control apparatus 204 being taken into account.

9. Method according to any one of the preceding aspects, characterized in that, upon identification of an interior space temperature that is below a temperature threshold value 529, the temperature-control apparatus 204 is operated such that the temperature-control apparatus 204 heats the interior space 212A of the analysis device 200 until the interior space temperature reaches or exceeds the temperature threshold value 529, the test preferably only being started and/or the sample P only being conveyed once the temperature threshold value 529 has been reached or exceeded.

10. Method according to any one of the preceding aspects, characterized in that the temperature-control apparatus 204 for temperature-controlling the cartridge 100 can be or is positioned directly against the cartridge 100.

11. Method according to any one of the preceding aspects, characterized in that, on the side facing away from the cartridge 100, the temperature-control apparatus 204 comprises a heat sink 204D that is arranged in the interior space 212A of the analysis device 200 and that is heated in order to temperature-control the interior space 212A of the analysis device 200.

12. Method according to any one of the preceding aspects, characterized in that the temperature-control apparatus 204 comprises a Peltier element 204E by means of which the waste heat is generated and/or the interior space temperature is controlled or feedback controlled, the Peltier element 204E preferably being operated cyclically.

13. Method according to any one of the preceding aspects, characterized in that the test is started when the temperature threshold value 529 is reached.

14. Computer program product comprising program code means which, when executed, cause the steps of the method of any one of the preceding aspects to be implemented.

15. Analysis system 1 for testing an in particular biological sample P, the analysis system 1 comprising a cartridge 100 for receiving the sample P, and the analysis system 1 comprising an analysis device 200 for receiving the cartridge 100 and subsequently carrying out the test using the received cartridge 100, characterized
in that the analysis device 200 is designed to compare the amount of energy 711C remaining in an energy storage means 211B of the analysis device 200 with an energy requirement 510D for the test before the start of the test, and to enable or to block a start of the test if the amount of energy 711C is below the energy requirement 510D; and/or
in that the analysis device 200 comprises a temperature-control apparatus 204 designed for temperature-controlling the cartridge 100 and is designed to control this temperature-control apparatus 204 depending on an interior space temperature of the analysis device 200.

What is claimed is:

1. An analysis system for testing a biological sample, comprising:
    a cartridge for receiving a sample, and
    an analysis device for receiving the cartridge and subsequently carrying out testing using the received cartridge,
    wherein the analysis device comprises an interior space which is delimited by a housing and a sensor for sensing temperature within the interior space, the sensor being positioned so as to be out of direct thermal contact with the cartridge when the cartridge is received within the interior space,
    wherein the analysis device has a temperature-control apparatus for temperature-controlling of the interior space irrespective of whether or not the cartridge is received within the interior space and for temperature-controlling the cartridge when received in the interior space, the temperature-control apparatus defining a cartridge insertion gap between opposed heating surfaces thereof and into which insertion gap the cartridge is insertable, wherein the opposed heating surfaces are configured to be positioned against the cartridge when the cartridge is inserted into the insertion gap, and wherein the temperature control apparatus is controlled by the temperature sensor and the temperature sensor is out of direct contact with the temperature-control apparatus.

2. The system according to claim 1, wherein the temperature-control apparatus is used to temperature-control the interior space in a manner adjusting the temperature within the interior space to compensate for local ambient temperatures at locations of use.

3. A method for controlling an analysis device for testing a biological sample received in a cartridge, the analysis device having an interior space which is delimited by a housing, a temperature-control apparatus having a temperature sensor that measures temperature within the interior space, the temperature sensor being positioned to be out of direct thermal contact with the cartridge when the cartridge is received in the interior space, and the temperature-control apparatus having a heating surface that is directly engageable with the cartridge when the cartridge is received in the interior space, the method comprising:
    using the temperature sensor to measure the temperature of the interior space,
    using the temperature-control apparatus for temperature-controlling of the interior space based on the temperature measured and irrespective of whether or not the cartridge is received within the interior space,
    engaging the heating surface of the temperature-control apparatus with the cartridge, and
    testing the biological sample received in the cartridge, the temperature of the cartridge being directly controlled by said temperature-control apparatus during testing.

4. The method according to claim 3, comprising a further step of using a further temperature sensor that is in direct thermal contact with at least one of the temperature-control apparatus and the cartridge for temperature-control of the cartridge during testing.

5. The method according to claim 3, wherein the interior space temperature is changed using the temperature-control apparatus before the test is started.

6. The method according to claim 3, wherein the interior space temperature is feedback controlled using the temperature-control apparatus.

7. The method according to claim 6, wherein the interior space of the analysis device is heated using waste heat from the temperature-control apparatus.

8. The method according to claim 7, wherein the temperature-control apparatus comprises a Peltier element by means of which the waste heat is generated.

9. The method according to claim 8, wherein the Peltier element is operated cyclically.

10. The method according to claim 6, wherein a feedback control apparatus uses at least one of a temperature threshold value, the interior space temperature or the temperature-control apparatus as a feedback control element.

11. The method according to claim 6, wherein a minimum temperature forms part of control information used by the temperature-control apparatus.

12. The method according to claim 6, wherein a maximum temperature forms part of control information used by the temperature-control apparatus.

13. The method according to claim 3, wherein, upon identification of an interior space temperature that is below a temperature threshold value, the temperature-control apparatus is operated such that the temperature-control apparatus heats the interior space of the analysis device until the interior space temperature reaches or exceeds the temperature threshold value.

14. The method according to claim 13, wherein testing is only started once the temperature threshold value has been reached or exceeded.

15. The method according to claim 13, wherein testing of the sample in the cartridge is only performed once the temperature threshold value has been reached or exceeded.

16. The method according to claim 3, wherein the temperature-control apparatus for temperature-controlling the cartridge is positioned directly against the cartridge.

17. The method according to claim 3, wherein, on a side facing away from a side of the heating surface that engages the cartridge, the temperature-control apparatus comprises a heat sink that is arranged in the interior space of the analysis device and that is heated in order to temperature-control the interior space of the analysis device.

18. The method according to claim 3, wherein the temperature-control apparatus comprises a Peltier element by means of which the interior space temperature is controlled.

19. The method according to claim 3, wherein testing is started when a temperature threshold value of the interior space is reached.

20. An analysis system for testing a biological sample, comprising:
   a cartridge for receiving a sample, and
   an analysis device for receiving the cartridge and subsequently carrying out testing using the received cartridge,
   wherein the analysis device comprises an interior space which is delimited by a housing,
   wherein the analysis device has a temperature-control apparatus and a temperature sensor,
   wherein the temperature sensor is positioned to be out of direct thermal contact with the temperature-control apparatus and the cartridge even when the cartridge is received in the interior space and wherein the temperature sensor is operative for measuring a temperature of the interior space,
   wherein the temperature control apparatus comprises a heating surface that is directly engageable with the cartridge when the cartridge is received in the interior space; and
   wherein the temperature-control apparatus is configured to control the temperature of the interior space based on the temperature measured with the temperature sensor and to directly control the temperature of the cartridge at least in part when the cartridge is received within the interior space and when the cartridge directly engages the heating surface of the temperature control apparatus during testing.

21. The analysis system according to claim 20, further comprising a second temperature sensor that is in direct thermal contact with at least one of the temperature-control apparatus and the cartridge when the cartridge is received within the interior space.

22. The analysis system according to claim 20, wherein the heating surface of the temperature-control apparatus abuts against the cartridge when the cartridge is received within the interior space.

23. The analysis system for testing a biological sample according to claim 20, wherein the analysis system is portable having a weight of less than 25 kg, and wherein the temperature-control apparatus is configured to control the temperature of the interior space to adjust the temperature within the interior space to compensate for local ambient temperatures at locations of use.

* * * * *